US012608540B1

(12) United States Patent
Shardha et al.

(10) Patent No.: US 12,608,540 B1
(45) Date of Patent: Apr. 21, 2026

(54) BREADTH SCORING USING RELEVANT DOCUMENT TERM FREQUENCY

(71) Applicant: Moat Metrics, Inc., Spokane, WA (US)

(72) Inventors: Hemakshi Shardha, Kearny, NJ (US); David Craig Andrews, Duvall, WA (US); John E. Bradley, III, Duvall, WA (US); Lewis C. Lee, Seattle, WA (US)

(73) Assignee: Moat Metrics, Inc., Spokane, WA (US)

( * ) Notice: Subject to any disclaimer, the term of this patent is extended or adjusted under 35 U.S.C. 154(b) by 230 days.

(21) Appl. No.: 18/374,340

(22) Filed: Sep. 28, 2023

(51) Int. Cl.
| | |
|---|---|
| *G06F 40/194* | (2020.01) |
| *G06F 40/279* | (2020.01) |
| *G06Q 50/18* | (2012.01) |

(52) U.S. Cl.
CPC .......... *G06F 40/194* (2020.01); *G06F 40/279* (2020.01); *G06Q 50/184* (2013.01)

(58) Field of Classification Search
CPC .... G06F 40/194; G06F 40/279; G06Q 50/184
See application file for complete search history.

(56) References Cited

U.S. PATENT DOCUMENTS

| | | | | |
|---|---|---|---|---|
| 2003/0036945 A1* | 2/2003 | Del Vecchio | .......... | G06Q 10/10 |
| | | | | 705/310 |
| 2010/0125601 A1* | 5/2010 | Jackson | .............. | G06F 16/3334 |
| | | | | 707/E17.014 |
| 2018/0300323 A1* | 10/2018 | Lee | ........................ | G06F 16/353 |
| 2020/0159784 A1* | 5/2020 | Kikuchi | ................. | G06N 20/00 |
| 2020/0372371 A1* | 11/2020 | Sabanayagam | ......... | G06F 17/18 |
| 2021/0097679 A1* | 4/2021 | Polzin | ........................ | G06T 7/20 |
| 2022/0180059 A1* | 6/2022 | Lee | ........................ | G06F 16/93 |
| 2022/0321541 A1* | 10/2022 | Zhao | ..................... | G06N 20/00 |

* cited by examiner

*Primary Examiner* — Darioush Agahi
(74) *Attorney, Agent, or Firm* — Lee & Hayes, P.C.

(57) ABSTRACT

Systems and methods for generation and use of document analysis platform architectures are disclosed. The document analysis platform may be configured to determine word frequencies for words included in a given portion of a given document based on a frequency of occurrences of the words in additional documents that are similar to the given document. The document analysis platform may utilize one or more formulas to determine word weights for the words based on the frequencies. The document analysis platform may then determine one or more scores (e.g., word scores, breadth scores, document scores, etc.) by assigning the word weights to the words. The document analysis platform may also determine a likelihood of infringement of a given document in a district court action. The document analysis platform may utilize machine-learned (ML) models and/or generative artificial intelligence (AI) to determine similarities, word weights, and/or likelihoods of infringement.

17 Claims, 11 Drawing Sheets

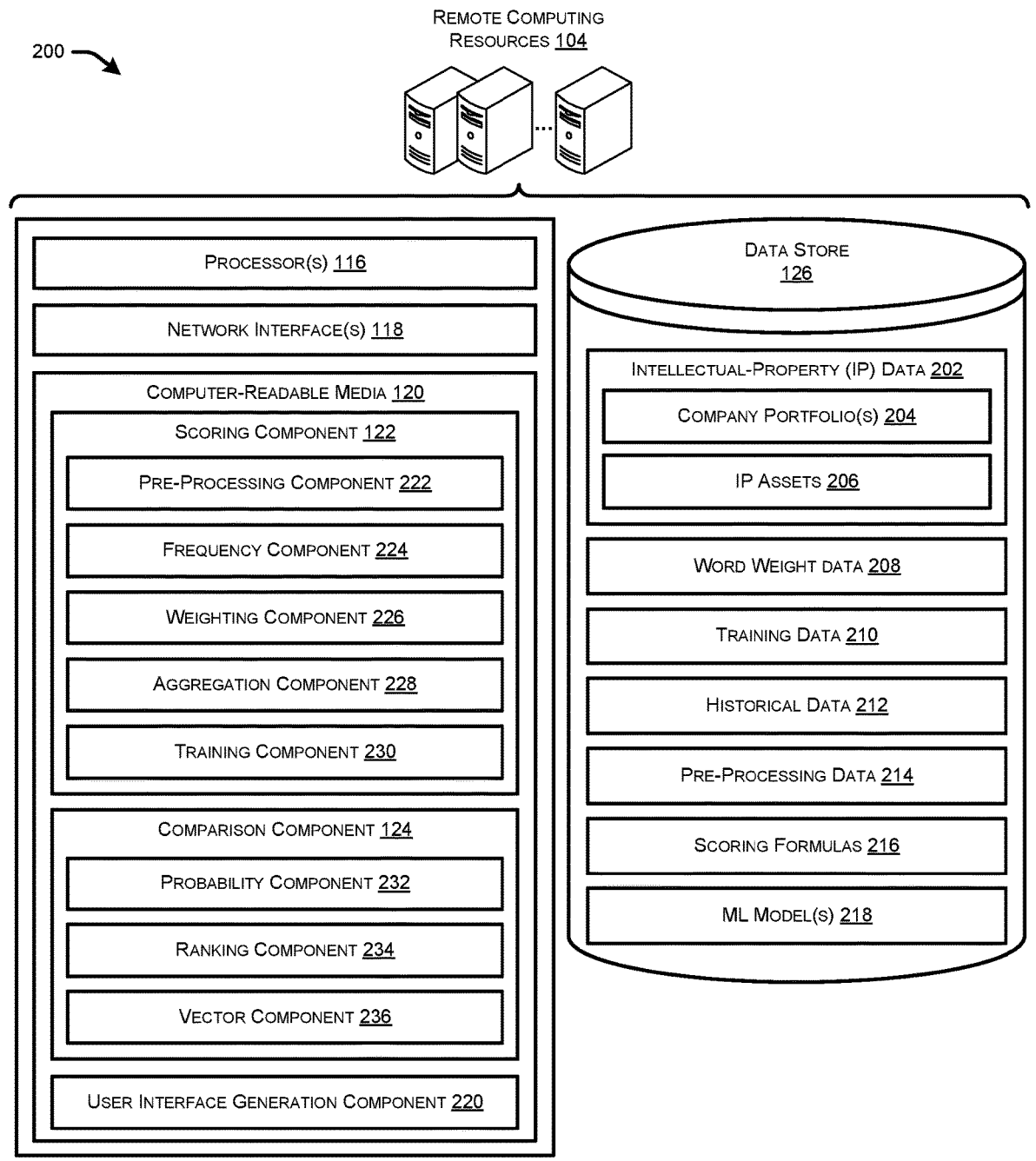

REMOTE COMPUTING
RESOURCES 104

PROCESSOR(S) 116

NETWORK INTERFACE(S) 118

COMPUTER-READABLE MEDIA 120

SCORING COMPONENT 122

PRE-PROCESSING COMPONENT 222

FREQUENCY COMPONENT 224

WEIGHTING COMPONENT 226

AGGREGATION COMPONENT 228

TRAINING COMPONENT 230

COMPARISON COMPONENT 124

PROBABILITY COMPONENT 232

RANKING COMPONENT 234

VECTOR COMPONENT 236

USER INTERFACE GENERATION COMPONENT 220

DATA STORE
126

INTELLECTUAL-PROPERTY (IP) DATA 202

COMPANY PORTFOLIO(S) 204

IP ASSETS 206

WORD WEIGHT DATA 208

TRAINING DATA 210

HISTORICAL DATA 212

PRE-PROCESSING DATA 214

SCORING FORMULAS 216

ML MODEL(S) 218

FIG. 2

300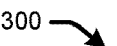

Identify elements within a claim
302

Determine word weights for technology category
304

306(1)

$$1 - \frac{Count\ D_t}{N_t}$$

306(2)

$$1 - \sqrt[3]{\frac{Count\ D_t}{N_t}}$$

306(N)

$$\left| log\left( \sqrt[3]{\frac{Count\ D_t}{N_t}} \right) \right|$$

Generate raw claim score based on claim elements and word weights
308

Normalize raw claim score to generate a bounded claim score
310

Invert bounded claim score to generate a final claim score
312

FIG. 3

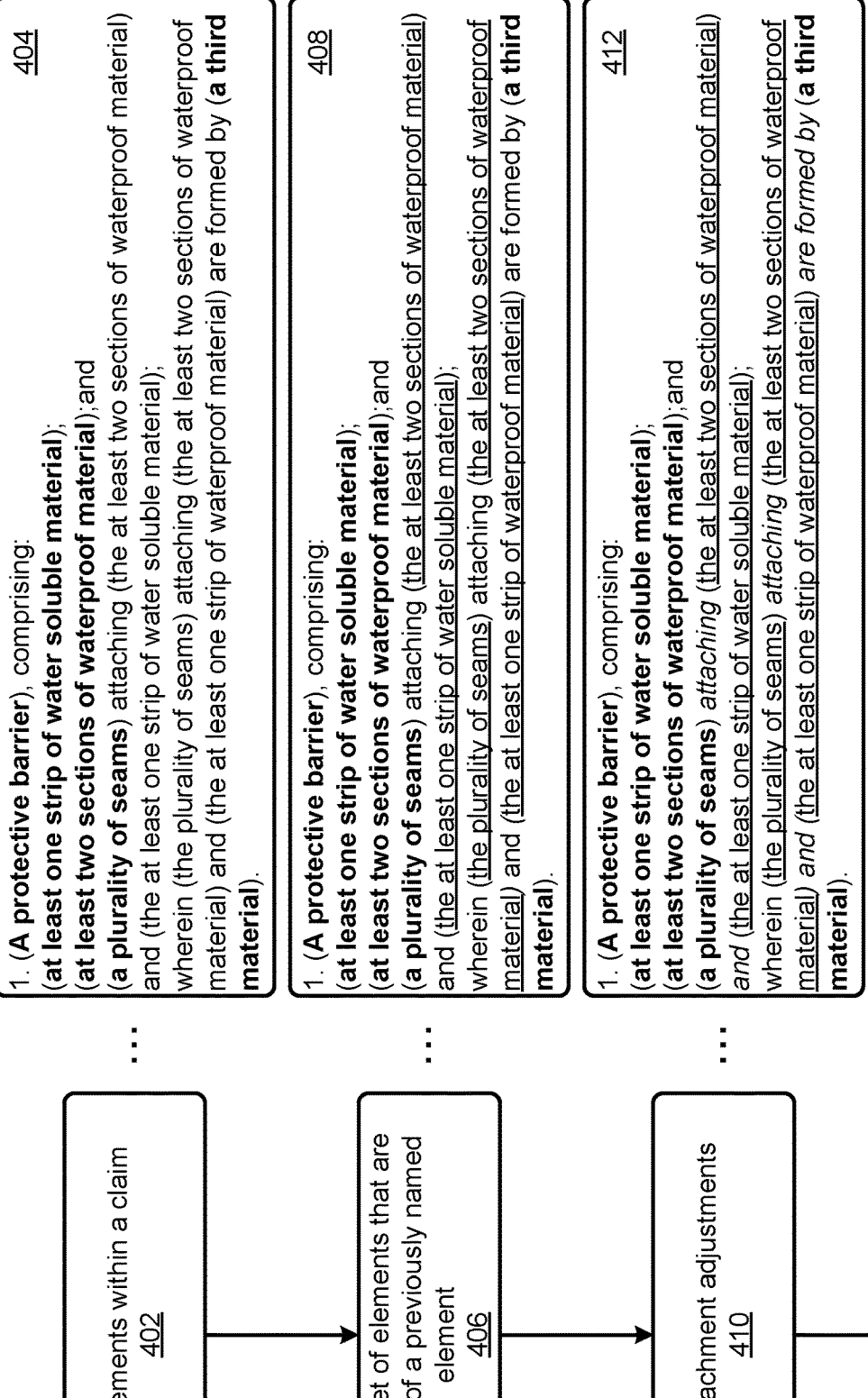

404

1. (A protective barrier), comprising:
(at least one strip of water soluble material);
(at least two sections of waterproof material);and
(a plurality of seams) attaching (the at least two sections of waterproof material) and (the at least one strip of water soluble material);
wherein (the plurality of seams) attaching (the at least two sections of waterproof material) and (the at least one strip of waterproof material) are formed by (a third material).

408

1. (A protective barrier), comprising:
(at least one strip of water soluble material);
(at least two sections of waterproof material);and
(a plurality of seams) attaching (the at least two sections of waterproof material) and (the at least one strip of water soluble material);
wherein (the plurality of seams) attaching (the at least two sections of waterproof material) and (the at least one strip of waterproof material) are formed by (a third material).

412

1. (A protective barrier), comprising:
(at least one strip of water soluble material);
(at least two sections of waterproof material);and
(a plurality of seams) *attaching* (the at least two sections of waterproof material) and (the at least one strip of water soluble material);
wherein (the plurality of seams) *attaching* (the at least two sections of waterproof material) and (the at least one strip of waterproof material) *are formed by* (a third material).

Identify elements within a claim
402

Identify a set of elements that are recitations of a previously named element
406

Identify attachment adjustments
410

Generate tree of claim elements
414

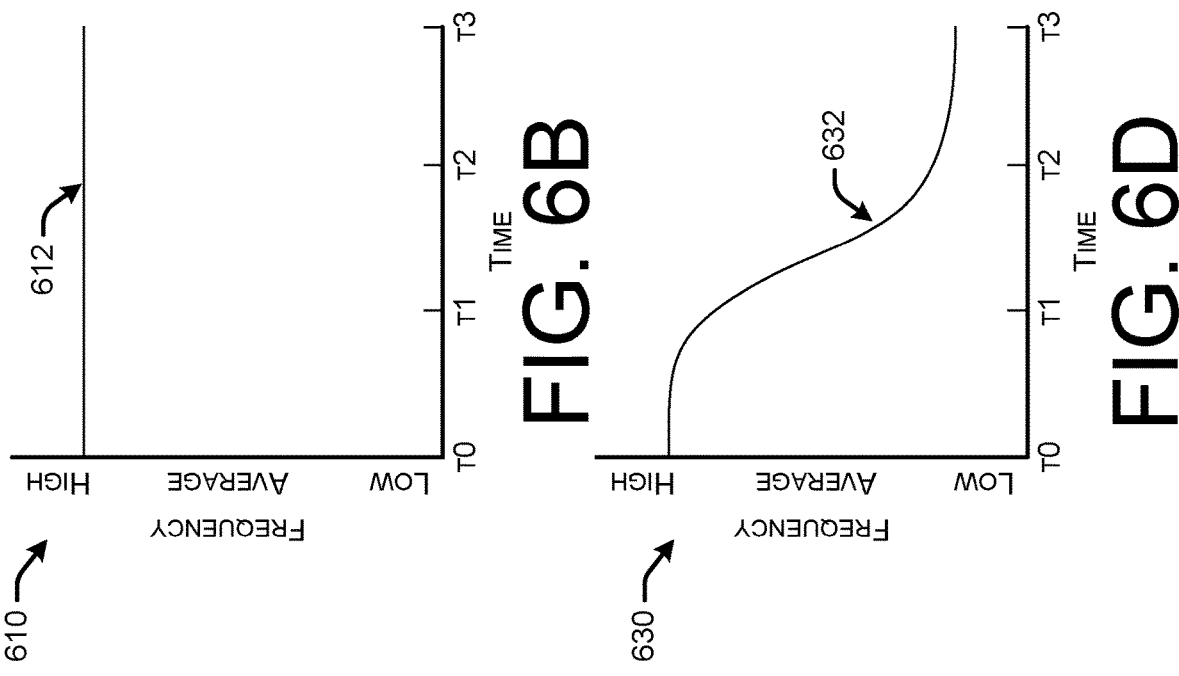
FIG. 6A
FIG. 6B
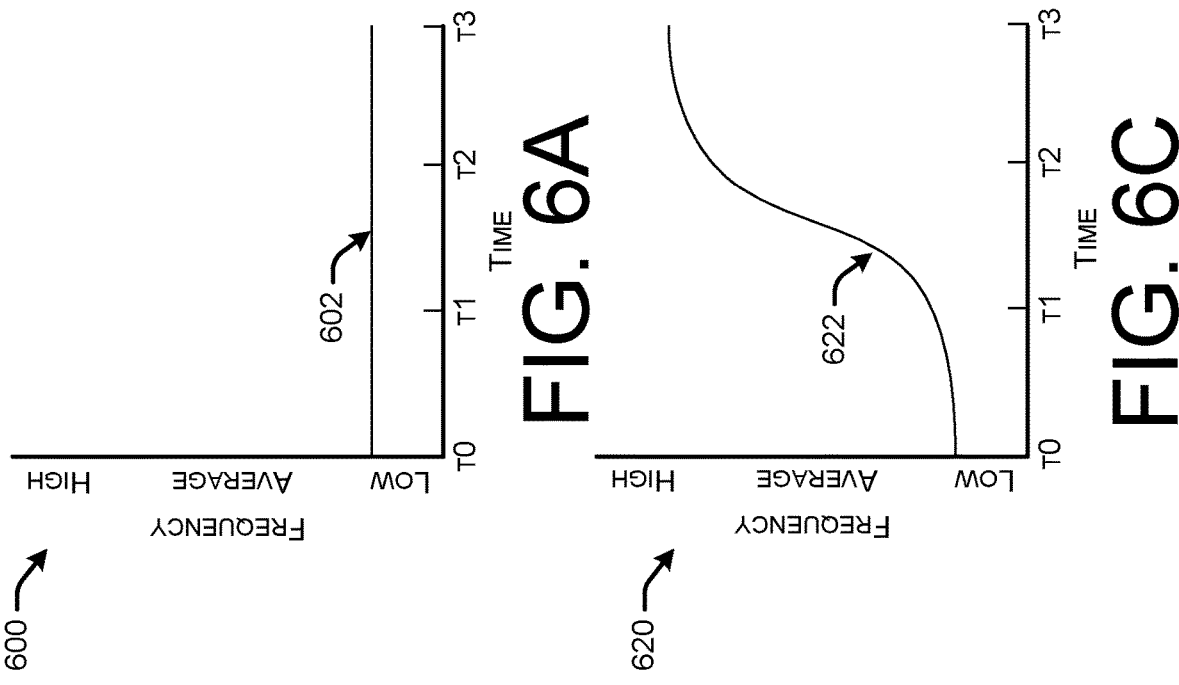
FIG. 6C
FIG. 6D

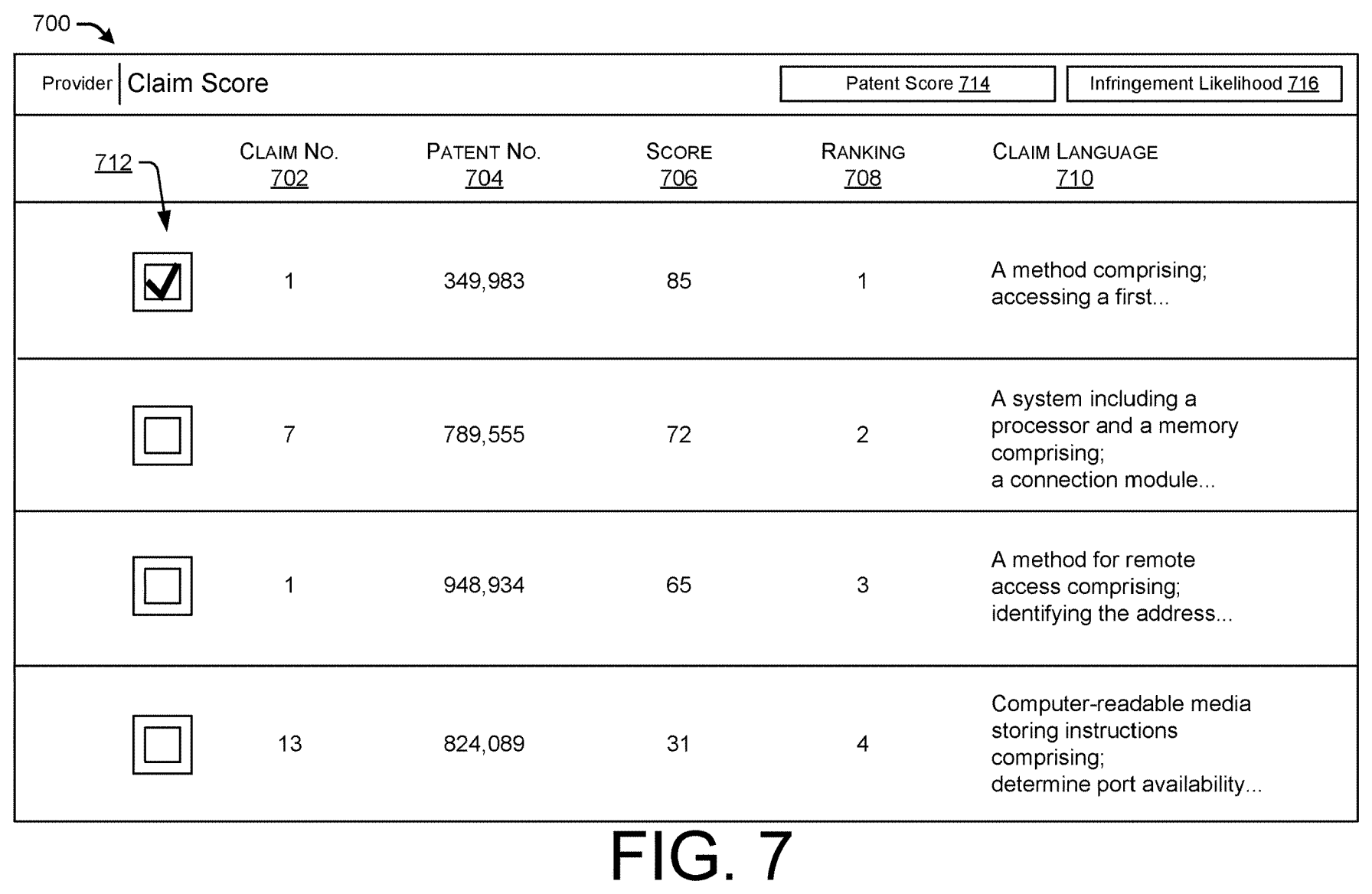

700 ⟶

| Provider | Claim Score | | | | | Patent Score 714 | Infringement Likelihood 716 |
|---|---|---|---|---|---|---|---|

| CLAIM NO. 702 | PATENT NO. 704 | SCORE 706 | RANKING 708 | CLAIM LANGUAGE 710 |
|---|---|---|---|---|
| 712 ⟶ ☑   1 | 349,983 | 85 | 1 | A method comprising; accessing a first… |
| ☐   7 | 789,555 | 72 | 2 | A system including a processor and a memory comprising; a connection module… |
| ☐   1 | 948,934 | 65 | 3 | A method for remote access comprising; identifying the address… |
| ☐   13 | 824,089 | 31 | 4 | Computer-readable media storing instructions comprising; determine port availability… |

FIG. 7

Figure 8:
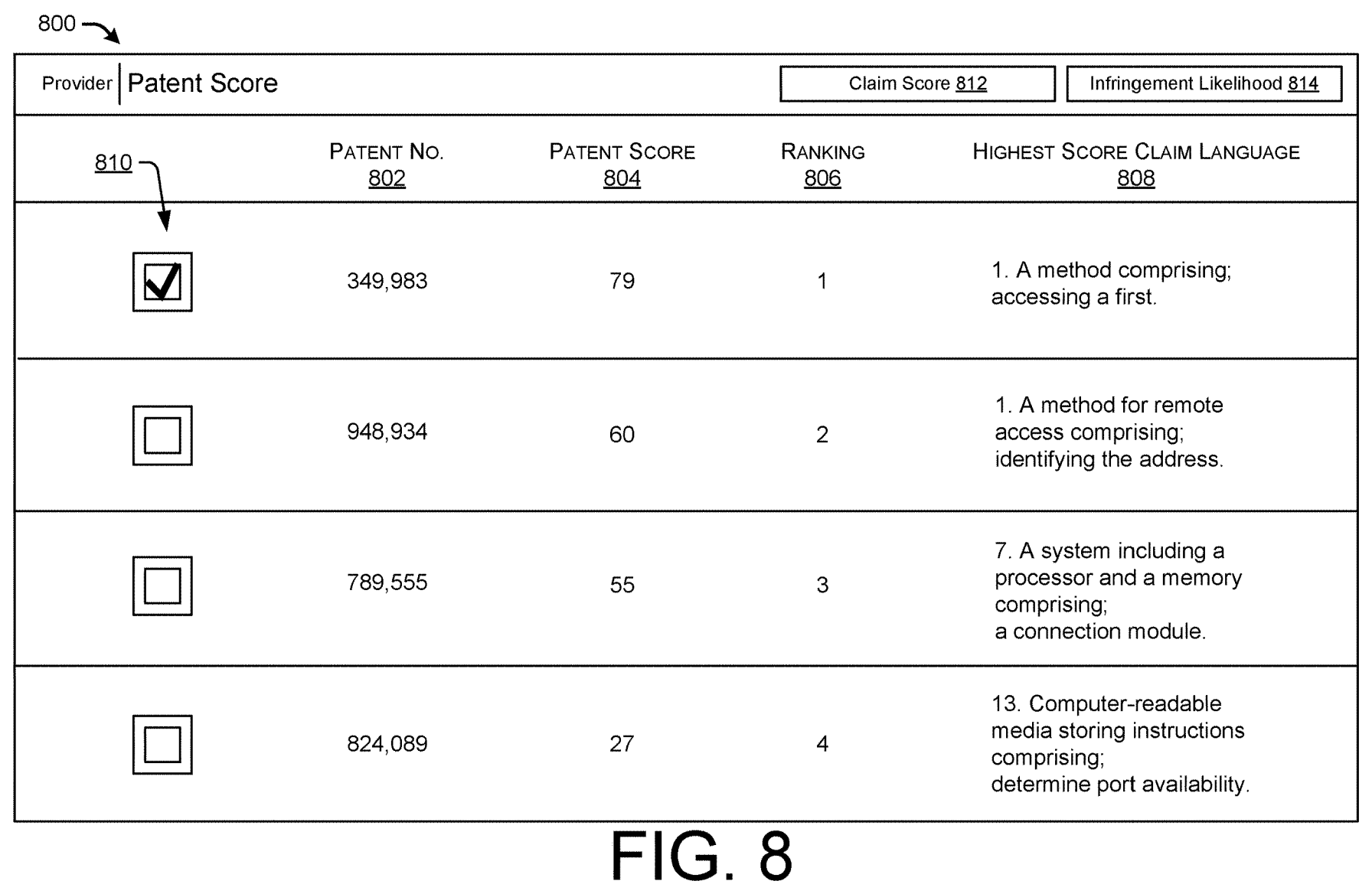

| Provider | Patent Score | | | Claim Score 812 | Infringement Likelihood 814 |
|---|---|---|---|---|---|
| | PATENT NO. 802 | PATENT SCORE 804 | RANKING 806 | HIGHEST SCORE CLAIM LANGUAGE 808 | |
| ☑ 810 | 349,983 | 79 | 1 | 1. A method comprising; accessing a first. | |
| ☐ | 948,934 | 60 | 2 | 1. A method for remote access comprising; identifying the address. | |
| ☐ | 789,555 | 55 | 3 | 7. A system including a processor and a memory comprising; a connection module. | |
| ☐ | 824,089 | 27 | 4 | 13. Computer-readable media storing instructions comprising; determine port availability. | |

Figure 10:
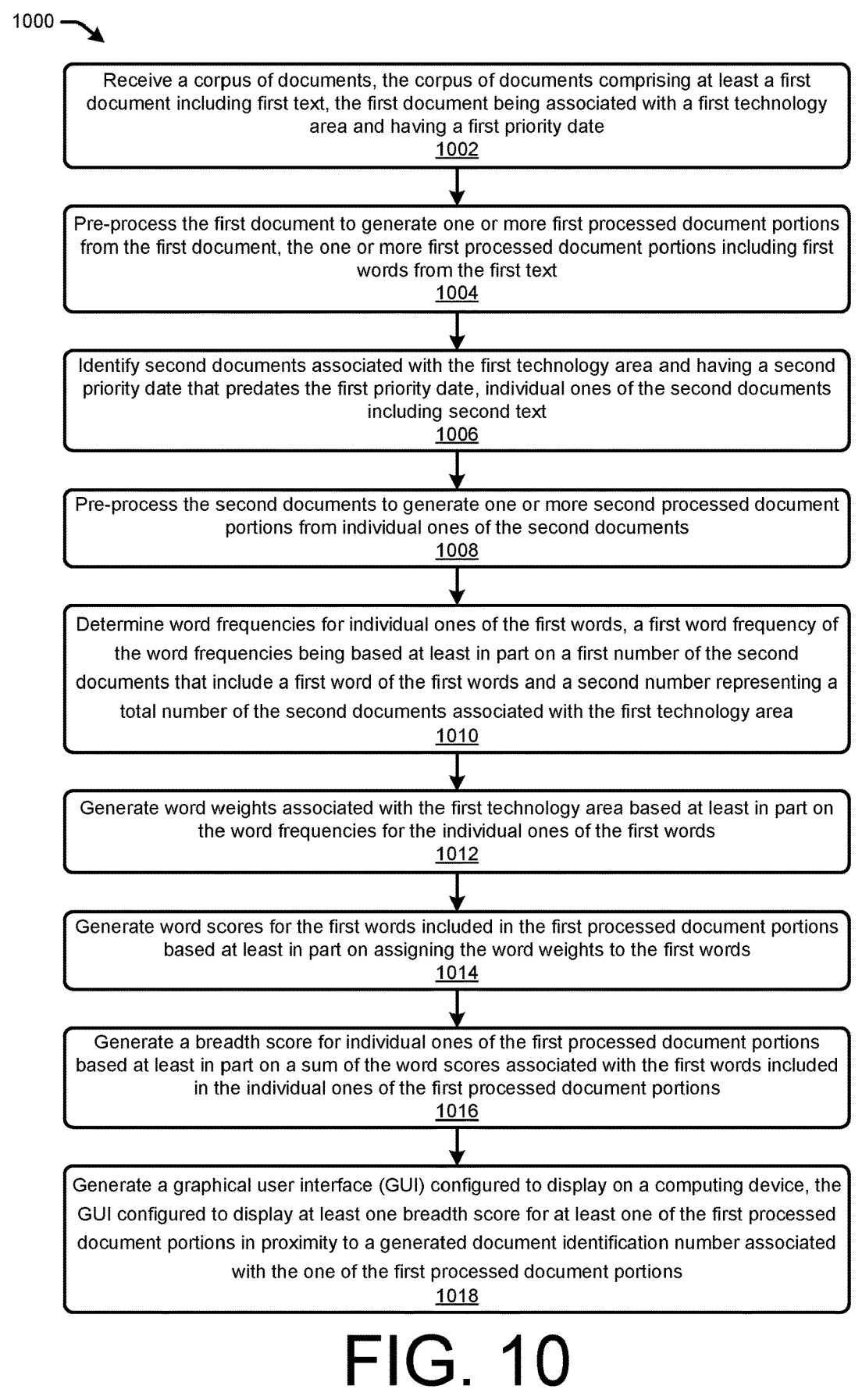

Receive a corpus of documents, the corpus of documents comprising at least a first document including first text, the first document being associated with a first technology area and having a first priority date
1002

↓

Pre-process the first document to generate one or more first processed document portions from the first document, the one or more first processed document portions including first words from the first text
1004

↓

Identify second documents associated with the first technology area and having a second priority date that predates the first priority date, individual ones of the second documents including second text
1006

↓

Pre-process the second documents to generate one or more second processed document portions from individual ones of the second documents
1008

↓

Determine word frequencies for individual ones of the first words, a first word frequency of the word frequencies being based at least in part on a first number of the second documents that include a first word of the first words and a second number representing a total number of the second documents associated with the first technology area
1010

↓

Generate word weights associated with the first technology area based at least in part on the word frequencies for the individual ones of the first words
1012

↓

Generate word scores for the first words included in the first processed document portions based at least in part on assigning the word weights to the first words
1014

↓

Generate a breadth score for individual ones of the first processed document portions based at least in part on a sum of the word scores associated with the first words included in the individual ones of the first processed document portions
1016

↓

Generate a graphical user interface (GUI) configured to display on a computing device, the GUI configured to display at least one breadth score for at least one of the first processed document portions in proximity to a generated document identification number associated with the one of the first processed document portions
1018

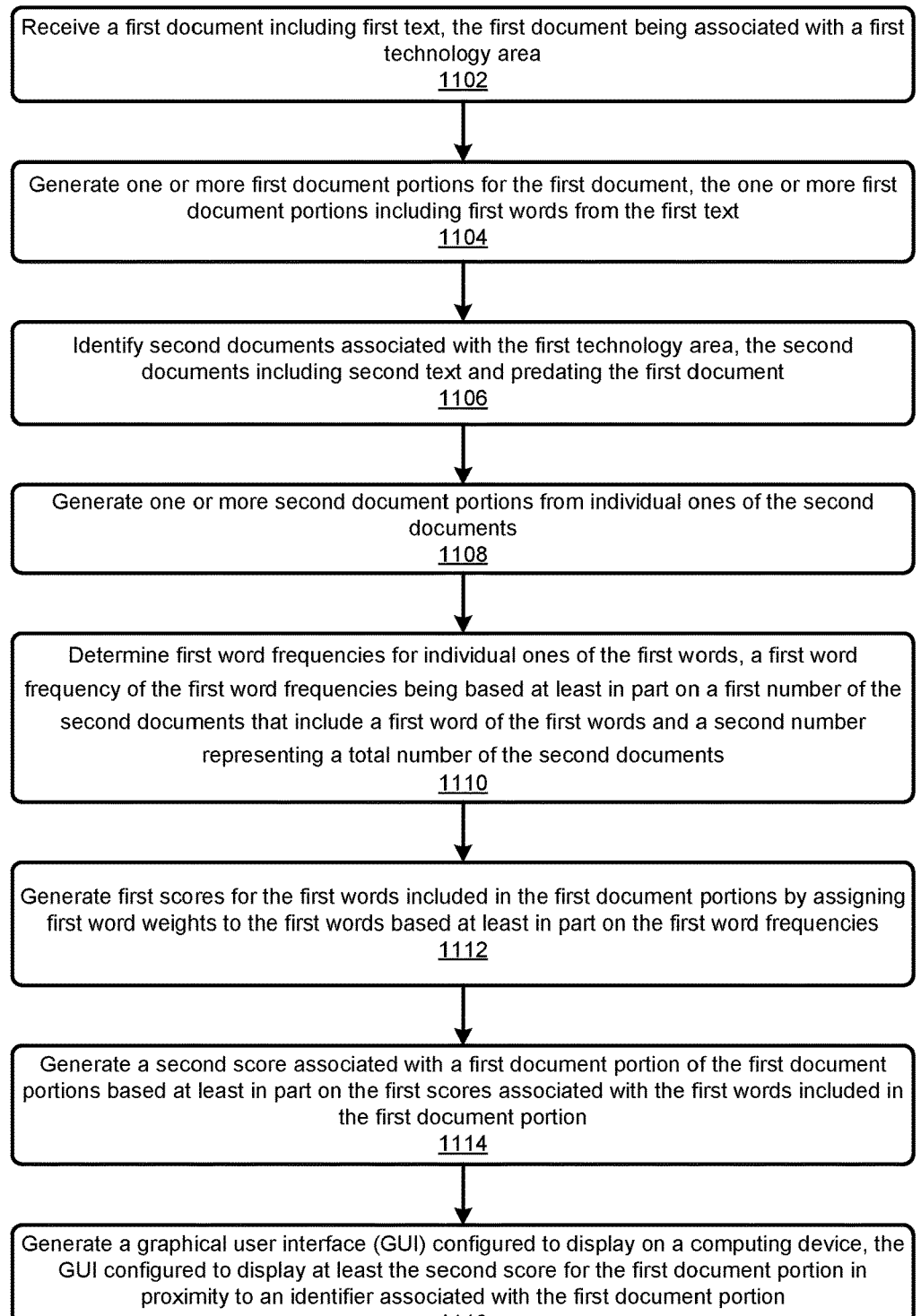

Receive a first document including first text, the first document being associated with a first technology area
1102

Generate one or more first document portions for the first document, the one or more first document portions including first words from the first text
1104

Identify second documents associated with the first technology area, the second documents including second text and predating the first document
1106

Generate one or more second document portions from individual ones of the second documents
1108

Determine first word frequencies for individual ones of the first words, a first word frequency of the first word frequencies being based at least in part on a first number of the second documents that include a first word of the first words and a second number representing a total number of the second documents
1110

Generate first scores for the first words included in the first document portions by assigning first word weights to the first words based at least in part on the first word frequencies
1112

Generate a second score associated with a first document portion of the first document portions based at least in part on the first scores associated with the first words included in the first document portion
1114

Generate a graphical user interface (GUI) configured to display on a computing device, the GUI configured to display at least the second score for the first document portion in proximity to an identifier associated with the first document portion
1116

FIG. 11

BREADTH SCORING USING RELEVANT DOCUMENT TERM FREQUENCY

BACKGROUND

The amount of information contained in documents is rapidly increasing. There are many industries such as law, education, journalism, politics, economics, etc. that may benefit from rapid and low-cost document analysis. The cost and relatively slow speed of manual, human analysis makes it effectively impossible or impracticable to perform document analysis at the scale, speed, and cost desired in many industries. "Offshoring" to take advantage of lower costs may allow the hiring of a larger number of people to analyze documents at a lower price per hour of labor. Even so, there is a lower bound on costs and an upper bound on throughput. Using multiple different people to provide manual analysis also has a strong potential to introduce inconsistencies because of variation in different individuals' subjective judgment. For example, analyzing a corpus of a million 30-page text documents overnight would be impossible using only human analysis. Automated document analysis using computers is much quicker than human analysis and performs at much lower cost. Additionally, automated document analysis provides for consistent and objective analysis that reduces discrepancies seen with subjective, error-prone human analysis. Further, human analysis is often difficult and impractical when analyzing documents in different languages. In order to analyze documents in a large number of languages, large amounts of humans which speak different languages and are trained to analyze the documents are required. Thus, devices and methods that can analyze documents in a way that emulates human analysis, and are applicable to a large number of languages, will have broad application across many different industries.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a component diagram of example components of a remote computing resource for the document analysis platform.

FIG. 3 illustrates an example flow diagram of an example process for generating a score for given a document portion.

FIG. 4 illustrates an example flow diagram of an example process for generating a weighting tree.

FIG. 6A illustrates an example word frequency graph for a target word in a target technology area.

FIG. 6B illustrates another example word frequency graph for a target word in a target technology area.

FIG. 6C illustrates another example word frequency graph for a target word in a target technology area.

FIG. 6D illustrates another example word frequency graph for a target word in a target technology area.

FIG. 7 illustrates an example user interface configured to display one or more indications of document portions in association with one or more scores.

FIG. 8 illustrates another example user interface configured to display one or more documents in association with one or more scores.

FIG. 10 illustrates an example flow diagram of an example process for generating a breadth score for portions of a first document using word scores generated for the individual words based on word weights generated according to the word frequencies, of the words found in the first document portions, with respect to their occurrences in second documents that are similar to the first document.

FIG. 11 illustrates an example flow diagram of another example process for generating a breadth score for portions of a first document using word scores generated for the individual words based on word weights generated according to the word frequencies, of the words found in the first document portions, with respect to their occurrences in second documents that are similar to the first document.

DETAILED DESCRIPTION

Figure 1:
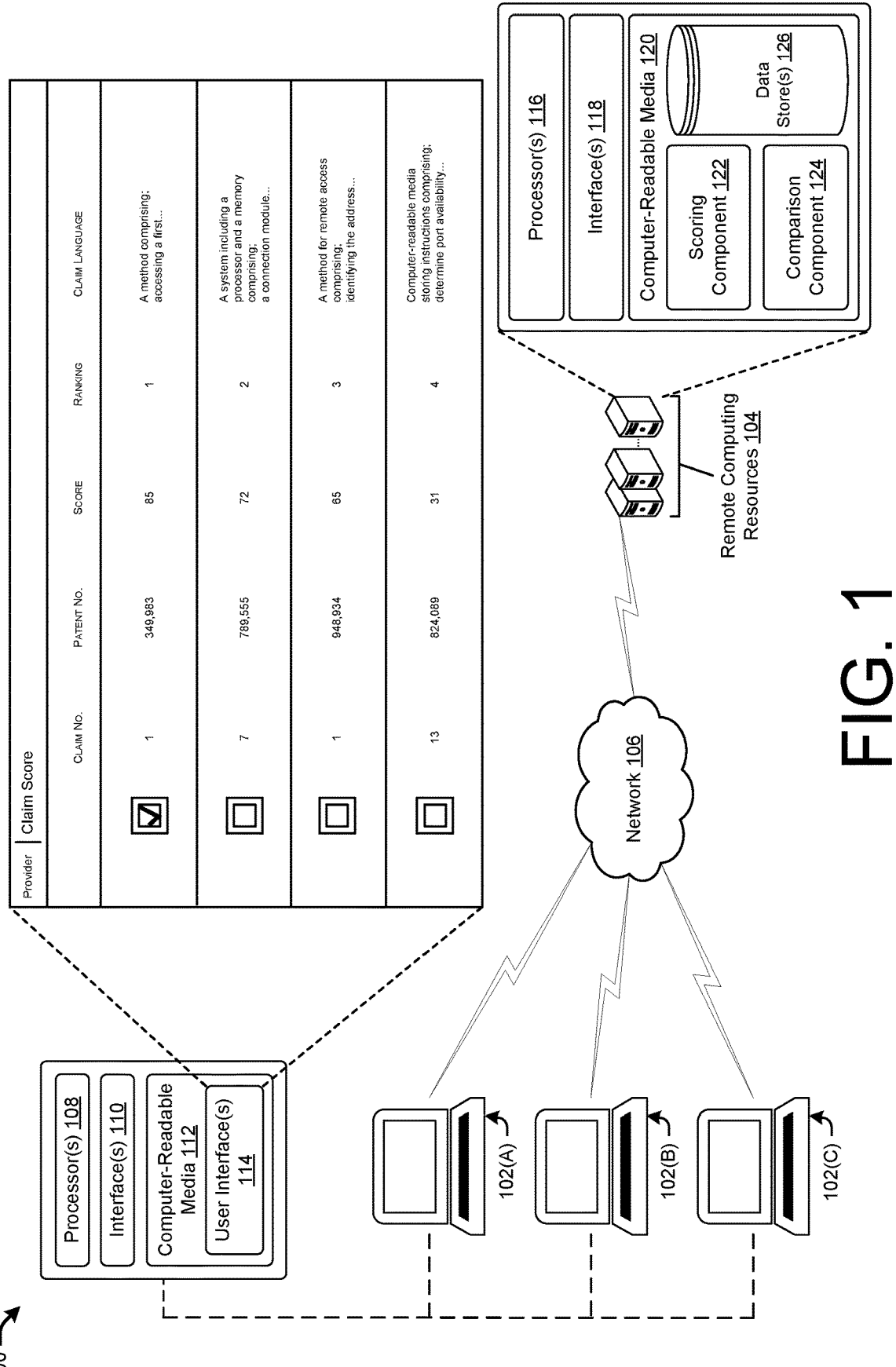
FIG. 1 illustrates a schematic diagram of an example environment for a document analysis platform architecture.

Systems and methods for generation and use of a document analysis platform are disclosed. Take, for example, an entity that would find it beneficial to utilize a platform to analyze a document and determine how broad or narrow respective portions of the document is and, for the individual words in the document, a word frequency (or element frequency) based on how often an individual word (or a sequence of words included in an element) occurs in additional documents that are similar to the first document (e.g., vector similarity, technology area similarity, etc.). For example, an entity may desire the ability to quantify the breadth of various document portions of an IP portfolio and/or make various determinations about the document portions based on the breadth measurements for patentability determinations, for infringement determinations, for asset acquisition purposes, for research and development purposes, for insurance purposes, and the like. Generally, a user may analyze IP assets and consider various aspects to ascertain some idea of what kind of technologies the IP asset is directed to, and how broad or narrow (e.g., the breadth of the IP asset) the protection offered by the asset is. To gather a quantifiable idea of an IP assets breadth, users may compare the IP asset to a number of additional IP assets that are similar to the IP asset, such as, for example, IP assets of a similar technology category (e.g., assets having a similar or the same cooperative patent classification (CPC) code as the target IP asset) to establish a baseline for such quantification. Additionally, or alternatively, vectorization techniques, generative artificial intelligence (AI) and/or machine-learning (ML) models may be utilized to determine similarity between documents, document portions, and/or words. Moreover, word weights may be determined for individual words in a given IP asset to accurately quantify an IP assets breadth. However, taking patents and patent applications as an example, the potential portfolios of some companies, even if just looking to patents and patent applications filed in the United States, easily numbers in the thousands if not tens of thousands or more. Additionally, it may be cumbersome to maintain consistent and objective analysis using subjective, error-prone human analysis that often leads to increased discrepancies. Further, with CPC codes having hundreds of thousands of categories/sub-categories, calculating the word weights for IP assets, each having thousands or even tens of thousands of words, across various technology categories (e.g., CPC codes) would take a significant amount of time. In light of this, a document analysis platform that is configured to calculate a breadth score associated with a given portion of a document using technology categorization specific word weights may be beneficial. Additionally, comparative breadth scores associated with IP assets may be generated and displayed on a graphical user interface, indicating which first IP assets and/or portions thereof have a greater or lesser breadth as compared to second IP assets and/or portions thereof. Further, comparison data may be generated, representing a likelihood of infringement of a given IP asset and/or portion thereof in a district court action, and a graphical element may be generated, indicating the likelihood in association with one or more groups representing document breadth.

Described herein is a document analysis platform that is configured to generate processed document portions from a given document, identify documents associated with a given technology area, determine word frequencies associated with the given technology area for words in the given document, generate word weights for the words, generate word scores for the words, generate breadth scores for the document portions, generate comparative breadth scores for the document portions, and/or generate comparison data for the document portions. The platform may include a scoring component, a comparison component, a user interface generation component, and/or one or more data store(s). In some examples, the scoring component may include various sub-components, such as, a pre-processing component, a frequency component, a weighting component, an aggregation component, and/or a training component. Generally, the scoring component may utilize any number of its components to pre-process one or more documents to generate one or more processed document portions, determine word frequencies for individual words in a given document portion and/or processed document portion, generate word weights associated with a given technology area, generate word scores for the individual words in a given document portion and/or processed document portion, generate a raw breadth score (also referred to herein as a preliminary breadth score) for a given document portion, processed document portion, and/or document, generate a bounded breadth score (also referred to herein as a normalized score and/or a bounded score) for a given document portion, processed document portion, and/or document, generate an inverted breadth score (also referred to herein as an overall breadth score, claim score, and/or breadth score) for a given document portion, processed document portion, and/or document, generate training data configured to train an ML model, and/or generate one or more ML model(s) configured to output word weights for individual words in a given technology area. Additionally, or alternatively, the comparison component may include various sub-components, such as, a probability component and/or a ranking component. Generally, the comparison component may utilize any number of its components to generate comparison data representing a likelihood of infringement of a given document in a district court action, generate a graphical element configured to present the comparison data on a graphical user interface, generate a ranking of document portions and/or documents based on breadth scores (e.g., raw breadth scores, bounded scores, inverted scores, etc.) to display the document portions and/or documents on a user interface according to the rank. The data store may be a secure data store accessible by the system and utilized to securely store IP data including one or more company portfolios and/or one or more IP assets, word weight data, training data, historical data, pre-processing data, one or more scoring formulas, and/or one or more ML models. The document analysis platform may be accessible to users via one or more user interfaces that may be configured to display information associated with one or more IP assets. Additionally, or alternatively, the user interface(s) may be configured to receive user input.

Documents stored in one or more data repositories (e.g., the one or more data stores, one or more remote data repositories, etc.) may be accessed automatically by one or more computing devices and analyzed based on one or more rule sets. The format, structure, and contents of any document stored in the data repositories may be initially unknown. Thus, part of the analysis may include filtering documents from a data repository and pre-processing the documents to identify those that are suitable for further analysis and to prepare the content of the documents for analysis. Examples of document types that may be analyzed include, but are not limited to, issued patents, published patent applications, issued trademarks, published trademark applications. The analysis may focus on specific portions of the documents such as, for example, abstracts or patent claims. Pre-processing may modify the document portions by standardizing the content and removing content that could negatively affect subsequent analysis through techniques such as, for example, punctuation removal, stop word removal, stemming/lemmatization, removal of alphanumeric and numeric, removal of duplicate words, and/or any combination thereof.

Breadth of the document portions is analyzed based on consideration of word count and commonality of words in an associated technology category, field of invention, CPC code, and/or the like. Thus, the number of unique words and the frequency with which those words appear in other document portions of the same or similar technology category and which predate a target document containing the document portions are the basis for automatically assigning a breadth value to a given document portion. For a given document portion, the word frequency of each unique word is determined with respect to the technology category. Then, word weights may be generated based on the word frequency. For example, words may be measured on a scale from common to rare. Rare words have a lower word frequency (e.g., occurring less often in documents of a given technology area), which may indicate that this word is more restrictive and thus may be given a higher weight than a word having a higher word frequency. Additionally, or alternatively, common words have a higher word frequency (e.g., words occurring more frequently in documents of a given technology area), which may indicate that the word is broader and thus may be given a lower weight than a word having a lower word frequency. In some examples, element frequencies may be determined based on the word frequencies. For example, elements comprising a sequence of words may be aggregated such that the word frequencies of the individual words of an element and/or the word frequencies of the sequence of words of an element may be utilized to determine an element frequency. In some examples, elements having more common words than rare words may be assigned a common element frequency. Additionally, or alternatively, elements having more rare words than common words may be assigned a rare element frequency. Word scores may be generated based upon assigning the generated word weights to corresponding words, where a raw breadth score may be calculated based on a sum of the word scores. The raw breadth score may be an unbounded number ranging from 0-N, where N may be any integer greater than 1 (e.g., 0 to infinite). Additionally, or alternatively, a bounded score may be calculated based on normalizing the breadth score with respect to one or more additional breadth scores. The bounded score may result in a number ranging from 0-100. Additionally, or alternatively, the final breadth score may be determined based on inverting the bounded score, where bounded scores below 50 will result in a final breadth score over 50, and bounded scores above 50 will result in a final breadth score below 50, for example.

If the document portion is a patent claim, the breadth value represents an automatically-estimated scope of a property right relative to other patent claims that are part of the same analysis. Thus, the document analysis platform is able to automatically determine that claim A is broader than claim B. This analysis is human-emulative because the results are similar to those achieved by manual, human analysis, but superior to human analysis by reducing subjective scoring and human-error. Moreover, this analysis is technology specific, meaning that claims are scored using analysis on documents relevant to the claim.

In some examples, the techniques may be applied to patent claims for applications in differing jurisdictions and written in differing languages. In some examples, the techniques may translate the patent claim language into English (or another language) and analyze the claims, while in other examples, no translation is needed and the patent claims may be analyzed in various foreign languages. For example, natural language processing (NLP) may be leveraged in tandem with NLP grammar corresponding to various languages and/or configurations. In various examples, varying substantive law that is jurisdiction-specific may be taken into account when analyzing patent claims in different jurisdictions. For example, words in the preamble of claims for Chinese patent claims may be given weight for patent claim breadth, whereas the preamble of claims for patent applications in the United States may not be given weight for determining claim breadth. In some examples, patent claims in different types of jurisdiction patent applications may be analyzed in various ways. For example, to determine breadth for patent claims in utility model patents filed in a jurisdiction, such as China, the utility model patent may have a scaling factor applied to it based on claim breadth scores determined for invention patents filed in that jurisdiction. Further discussion of these techniques for international claims are discussed below.

Breadth scores for various document portions analyzed together may be compared to generate a ranking of the document portions based on relative breadth scores. A user interface may be generated that shows unique document identification numbers and corresponding breadth scores and/or rankings of document portions.

As previously described, the scoring component may be configured to pre-process one or more documents to generate one or more processed document portions. Additionally, or alternatively, the pre-processing component may be configured to pre-process the documents and generate the processed document portions. In some examples, the documents may be an IP asset, and the document portions may be claims (e.g., patent claims). Various pre-processing techniques may be leveraged, such as, for example, natural language processing (NLP) and/or the like. Pre-processing may modify the document portions by standardizing the content and removing content that could negatively affect subsequent analysis through techniques such as, for example, punctuation removal, stop word removal, stemming/lemmatization, removal of alphanumeric and numeric, removal of duplicate words, and/or any combination thereof.

The scoring component may also be configured to determine word frequencies for individual words in a given document portion and/or processed document portion. Word frequencies may be determined for each word in a given document based on a technology area specific analysis. In some examples, the technology area for a given document may be determined based on the documents CPC code. A given CPC code may include a number of documents including, for example, published patent applications, issued patents, expired patents, and/or the like. In some examples, the number of documents in a given CPC code may be less than a threshold number, and the technology area may be adjusted to include additional similar technology areas, or changed to a broader technology area that encompasses the original technology area. Additionally, or alternatively, the number of documents in a given CPC code may be greater than a threshold number, and the technology area may be adjusted to exclude similar technology areas, or changed to a narrower technology area than the original technology area. The word frequencies for individual words in a given document portion and/or processed document portion, associated with a particular technology area, may be determined based on an analysis of the occurrences of such words in additional documents determined to be associated with the particular technology area.

In some examples, the frequency component may be configured to determine the word frequencies for the individual words in a given document portion and/or processed document portion. The individual word frequencies may be utilized to generate word weights for a given technology area. The frequency component may determine the frequency that the individual words in a particular document portion are found throughout an entire corpus of document portions in a technology area (e.g., a CPC code) that is associated with the particular document portion.

The scoring component may also be configured to generate word weights associated with a given technology area. The word weights may be based on the frequency that the individual words in a particular document portion are found throughout an entire corpus of document portions in a technology area (e.g., a CPC code) that is associated with the particular document portion.

In some examples, the weighting component may be configured to generate the word weights associated with a given technology area. For example, the word frequencies determined by the frequency component may be leveraged by the weighting component to generate the word weights based on one or more formula(s). In some instances, a word weight for an individual word may be based on 1 minus the quotient of the number of documents in a given technology area that contain the individual word divided by the total number of documents in the given technology area. Additionally, or alternatively, a word weight for an individual word may be based on 1 minus the cube root of the quotient of the number of documents in a given technology area that contain the individual word divided by the total number of documents in the given technology area. Additionally, or alternatively, a word weight for an individual word may be based on the absolute value of the logarithm of the cube root of the quotient of the number of documents in a given technology area that contain the individual word divided by the total number of documents in the given technology area. For example, the word weights associated with a given technology category may be generated by any one of the following formula(s):

$$\text{Word Weight} = 1 - \frac{\text{Count } D_t}{N_t} \quad (1)$$

$$\text{Word Weight} = 1 - \sqrt[3]{\frac{\text{Count } D_t}{N_t}} \quad (2)$$

$$\text{Word Weight} = \left| \log\left( \sqrt[3]{\frac{\text{Count } D_t}{N_t}} \right) \right| \quad (3)$$

where Count $D_t$ represents the number of patents within a given technology area and/or CPC t containing a given word and/or term D, and $N_t$ may represent all of the patents within the given CPC t.

With this calculation, a first word determined to be a common word in the given technology area may receive a lower word weight, and a second word determined to be a rare word (e.g., an uncommon word) in the given technology area may receive a higher word weight. For example, words may be measured on a scale from common to rare. Rare words have a lower word frequency (e.g., occurring less often in documents of a given technology area), which may indicate that this word is more restrictive and thus may be given a higher weight than a word having a higher word frequency. Additionally, or alternatively, common words have a higher word frequency (e.g., words occurring more frequently in documents of a given technology area), which may indicate that the word is broader and thus may be given a lower weight than a word having a lower word frequency.

The scoring component may also be configured to generate word scores for the individual words in a given document portion and/or processed document portion. In some examples, the aggregation component may be configured to generate the word scores for the individual words in a given document portion and/or processed document portion. For example, the aggregation component may generate the word scores by applying the word weights to the respective words in a given document portion and/or processed document portion.

The scoring component may also be configured to generate a raw breadth score (also referred to herein as a preliminary breadth score) for a given document portion, processed document portion, and/or document. Breadth score calculation is performed within the context of the other documents that are associated with the same or a similar technology area to the given document, determined to be similar to the given document, and/or that predate the given document. Examples which utilize other documents that predate a given document provide dynamic word weighting and scoring based on technology area of a given document under analysis and the priority date of such a document by measuring word frequencies in a given technology area of only documents that may be leveraged as prior art against a document under analysis. Additionally, or alternatively, examples which utilize other documents without considering the priority date provide robust word weighting and scoring based on a current state of the art of a given technology area. In some examples, the aggregation component may be configured to generate the raw breadth score for a given document portion, processed document portion, and/or document. Each document portion may be associated with its own raw breadth score. For example, the word scores for the individual words included in a given document portion may be summed to determine the raw breadth score. In some examples, the raw breadth score may be an unbounded number ranging from 0 to infinite. In some examples, the raw breadth scores corresponding to document portions of a given document may be further aggregated to determine a bounded breadth score of the document.

The scoring component may also be configured to generate abounded breadth score (also referred to herein as a normalized score and/or bounded score) for a given document portion, processed document portion, and/or document. In some examples, the aggregation component may be configured to generate the bounded breadth score for a given document portion, processed document portion, and/or document. For example, the aggregation component may be configured to generate a bounded breadth score by normalizing a raw breadth score (e.g., an unbounded score). That is, the aggregation component may generate a bounded breadth score, ranging on a bounded scale (e.g., 0-100), based on normalizing the raw breadth score according to any normalization equation, function, and/or formula. In some examples, the bounded breadth scores corresponding to document portions of a given document may be further aggregated to determine a bounded breadth score of the document.

The scoring component may also be configured to generate an inverted breadth score (also referred to herein as an overall breadth score, inverted score, claim score, and/or breadth score) for a given document portion. In some examples, the aggregation component may be configured to generate the inverted breadth score for a given document portion. For example, the aggregation component may be configured to generate an inverted breadth score by inverting the bounded breadth score. That is, the aggregation component may generate an inverted breadth score, ranging on the bounded scale associated with a bounded score (e.g., 0-100), based on inverting the bounded breadth score according to the bounded scale. For example, the inverted breadth score of a bounded breadth score of 75 on the bounded scale of 0-100 may be 25. That is, the inverted breadth score may be the sum of the value of the upper bound of the bounded scale (e.g., 100) minus the bounded breadth score. In some examples, the inverted breadth scores corresponding to document portions of a given document may be further aggregated to determine an inverted breadth score of the document.

Additionally, or alternatively, one or more ML models may be configured to generate the word weights associated with a given technology area. In some examples, the scoring component may be configured to generate one or more ML model(s) and the training component may be configured to generate training data to train the ML model(s). That is, a trained ML model may be configured to take a document and/or a document portion as input and output data representing word weights for a given technology area. Additionally, or Alternatively, the ML models may be configured with a feedback loop, such that training data may generated based on previous outputs of the ML models, and the ML models may be further trained on such training data to refine the data that is output.

The training component may be configured to train the models using machine-learning mechanisms. For example, a machine-learning mechanism can analyze training data to train a data model that creates an output, which can be one or more word weights for a technology area, one or more word weights at a given point in time, a raw breadth score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models and/or scoring formulas can be stored in the data store(s) associated with remote computing resources for use at a time after the data models have been trained (e.g., at runtime). Additionally, the training component may be configured to train the models using the machine learning mechanisms based on various scoring formulas (e.g., when outputting a breadth score). The training component may generate training data configured indicate word frequencies for individual words occurring in documents of a given technology area (e.g., a CPC code), at each technology area. That is, the training component may be configured to train one or more models such that the model(s) may take a document, or a document portion thereof, as an input and the model(s) may output word weights associated with the individual words in the document/document portion, word scores associated with the individual words in the document/document portions, and/or breadth scores associated with the individual document/document portions.

As previously described, the comparison component may be configured to generate comparison data representing a likelihood of infringement of a given document in a district court action. For example, a first document may be associated with a first technology area (e.g., a first CPC code). To determine a likelihood of infringement of the first document in a district court action, one or more patents associated with the first technology area and being associated with a litigation trial may be identified and further analyzed. That is, each of the identified patents (or portions therein) may undergo the analysis and scoring disclosed herein, such as, for example, pre-processing the patents, determining word frequencies, generating word scores, generating raw breadth scores, bounded breadth scores, and/or inverted breadth scores. With the identified patents in the first technology area processed, the comparison component and/or the likelihood component may generate comparison data. The comparison data may be generated based on comparing the breadth scores of the identified patents with the breadth score of the first document. In some examples, the comparison data may represent a likelihood of infringement of the first document in a district court action. Additionally, the outcome of the district court actions may be further utilized to generate the comparison data. That is, the comparison data may represent individual buckets or categories in which the first document may correspond to. For example, the comparison data may include four categories associated with the breadth scores, a first category for narrow breadth scores including documents (e.g., the patents), or portions thereof (e.g., the claims), having breadth scores ranging from 0-30, a second category for average breadth scores including documents, or portions thereof, having breadth scores ranging from 30-60, a third category for broad breadth scores including documents, or portions thereof, having breadth scores ranging from 60-80, and/or a fourth category for very broad breadth scores including documents, or portions thereof, having breadth scores ranging from 80-100. It should be understood that any number of categories/buckets may be utilized and associated with any range of breadth scores and the example categories described herein are exemplary. Additionally, or alternatively, each of the categories may include additional information indicating, for each individual category, a first percentage of the documents in a given category that were infringed and a second percentage of documents in the given category that were not infringed.

The comparison component may also be configured to generate a graphical element configured to present the comparison data on a graphical user interface. The graphical element may be generated based on the comparison data, and may configured as a bar graph, line graph, pie chart, or the like. Take, for example, a graphical element configured as a bar graph. In some examples, the graphical element may include an x-axis associated with the claim breadth and/or claim score (also referred to herein as a breadth score) and/or a y-axis associated with the percentage of total distinct count of patents identified as both associated with a particular technology area and associated with a district court action. That is, this percentage may indicate a first percentage of the identified documents (e.g., patents) that were infringed and/or a second percentage of the identified documents that were not infringed. Additionally, the x-axis may be divided into categories and/or buckets associated with the breadth of a document portion and/or document and/or the claim score associated with a document portion and/or document, as previously described above with respect to the comparison data.

The comparison component may also be configured to generate a ranking of document portions and/or documents based on breadth scores (e.g., raw breadth scores, bounded breadth scores, inverted breadth scores, etc.) to display the document portions and/or documents on a user interface according to the rank. In some examples, the ranking component may be configured to generate the ranking of document portions and/or documents based on breadth scores (e.g., raw breadth scores, bounded scores, inverted scores, etc.) to display the document portions and/or documents on a user interface according to the rank. For example, the ranking component may compare the claim score for two separate document portions and/or documents and determine that a first document portion has a more favorable (e.g., greater than) claim score than a second document portion. As such, a ranking may be determined where the first document is ranked first and the second document ranked second. When displayed on a user interface, the document portions and/or documents may be displayed according to the rank, where, in the above scenario, the first document would be presented at the top of the ranking and the second document is presented below the first document.

The user interface generation component may be configured to generate user interface element(s) and/or user interface pages described herein using data received from other components utilized by the system. In some examples, the user interface generation component may be communicatively coupled to the other components stored thereon the computer-readable media. In some examples, the user interface generation component may generate user interfaces configured to present information associated with particular document portions, documents, technology areas, and/or any other projects associated with a user account. Additionally, or alternatively, the user interface generation component may generate user interfaces including confidential information and may be configured to be accessible by only users with predetermined qualifications.

Example user interfaces that may be generated by the user interface generation component are described in greater detail below. It should be appreciated that the following user interfaces are exemplary, are not intended to be limiting, and the user interface generation component may be configured to generate additional user interfaces including additional information windows and/or interactive elements other than those described below.

As mentioned above, the document analysis platform may be configured to display a user interface for presenting information associated with one or more documents and/or document portions. For example, the user interface may include selectable portions that when selected, may present information associated with the scoring component and/or information associated with the comparison component. Additionally, or alternatively, the document analysis platform may be configured to cause the user interface to present information associated with the scoring component and/or information associated with the comparison component using different views. Additionally, or alternatively, the user interface(s) may include one or more information windows for presenting information associated with the one or more documents(s) and/or document portion(s).

When a user accesses the document analysis platform, the user interface may be caused to display one or more pages that present portions of the information associated with the scoring component and/or comparison component using information windows that are relevant to that page. Pages that may be accessed by a user account may include for example, a document portion (e.g., a claim) score page, a document (e.g., an IP asset) score page, and/or an infringement likelihood page. As mentioned above, each page presents information using information windows that are relevant to the that page.

As described herein, artificial intelligence, machine learning (ML), and/or the like can be used to dynamically make determinations, generate data, provide indications, and/or the like, thereby adding intelligence and context-awareness to an otherwise one-size-fits-all scheme for providing objective breadth analysis of IP assets using technology and/or priority based dynamic word weighting, determining infringement likelihoods based on historical analysis of technology and/or priority based correlated breadth scores, and/or additional or alternative services described herein. Generating dynamic word weights based on a frequency of occurrences in technology specific (e.g., a CPC code) documents that predate a target document provide a greater understanding of language used in similar technologies. Additionally, or alternatively, by adjusting the reach of the technology area that is targeted (e.g., moving up or down one or more CPC codes), the outputs can be further refined by using more data for training (e.g., targeting a CPC code that includes at threshold amount of IP assets), and/or processes can be optimized by utilizing less data for training (e.g., targeting a CPC code that includes at most a threshold amount of IP assets). In some examples, the ML models may be configured with a feedback loop, such that training data is generated based on historical outputs of the ML models, and the ML models may be further trained on such training data to refine the data that is output. Thus, techniques described herein improve existing technological processes.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for a document analysis architecture. The environment 100 may include, for example, one or more user devices 102(a)-(c), also described herein as electronic devices 102(a)-(c), and/or remote computing resources 104 associated with a document analysis platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

Figure 9:
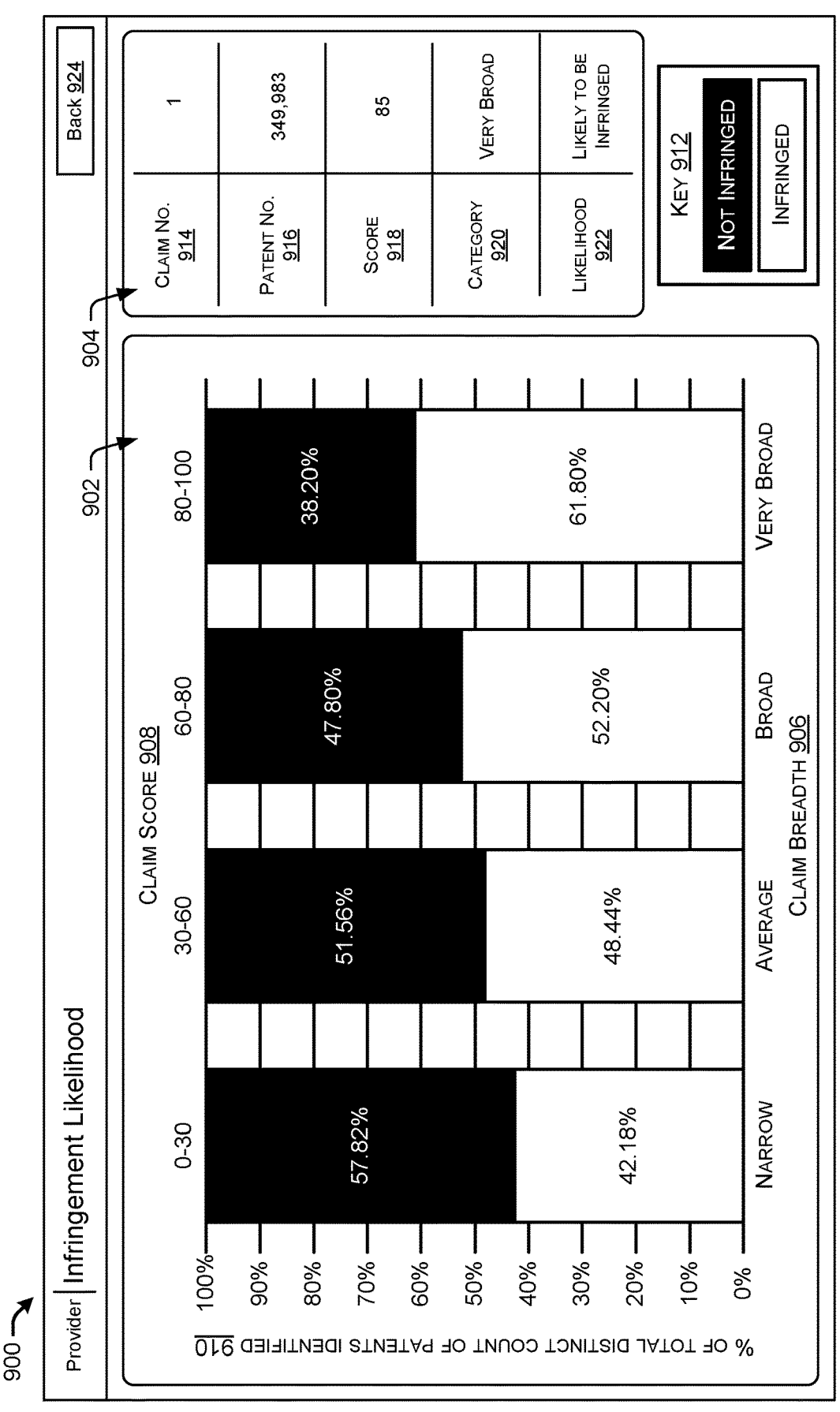
FIG. 9 illustrates another example user interface configured to display a graphic representing a likelihood of infringement of a given document portion in a district court action based on the claim score and/or additional information associated with the document portion.

By way of example, the user interface(s) 114 may include one or more of the user interfaces described elsewhere herein, such as the user interfaces described with respect to FIGS. 7-9, corresponding to a claim score page, a patent score page, and/or an infringement likelihood page, etc. It should be understood that while the user interface(s) 114 are depicted as being a component of the computer-readable media 112 of the electronic devices 102(a)-(c), the user interface(s) 114 may additionally or alternatively be associated with the remote computing resources 104. The user interface(s) 114 may be configured to display information associated with the document analysis platform and to receive user input associated with the document analysis platform.

The remote computing resources 104 may include one or more components such as, for example, one or more processors 116, one or more network interfaces 118, and/or computer-readable media 120. The computer-readable media 120 may include one or more components, such as, for example, a scoring component 122, a comparison component 124, and/or one or more data store(s) 126. The scoring component 122 may be configured to pre-process one or more documents to generate one or more processed document portions. Additionally, or alternatively, the scoring component 122 may be configured to determine word frequencies for individual words in a given document portion and/or processed document portion. Additionally, or alternatively, the scoring component 122 may be configured to generate word weights associated with a given technology area. Additionally, or alternatively, the scoring component 122 may be configured to generate word scores for the individual words in a given document portion and/or processed document portion. Additionally, or alternatively, the scoring component 122 may be configured to generate a raw breadth score (also referred to herein as a preliminary breadth score) for a given document portion, processed document portion, and/or document. Additionally, or alternatively, the scoring component 122 may be configured to generate a bounded breadth score (also referred to herein as a normalized score and/or a bounded score) for a given document portion, processed document portion, and/or document. Additionally, or alternatively, the scoring component 122 may be configured to generate an inverted breadth score (also referred to herein as an overall breadth score, claim score, and/or breadth score) for a given document portion, processed document portion, and/or document. Additionally, or alternatively, the scoring component 122 may be configured to generate training data configured to train an ML model. Additionally, or alternatively, the scoring component 122 may be configured to generate one or more ML model(s) configured to output word weights for individual words in a given technology area.

The comparison component 124 may be configured to generate comparison data representing a likelihood of infringement of a given document in a district court action. Additionally, or alternatively, the comparison component 124 may be configured to generate a graphical element configured to present the comparison data on a graphical user interface. Additionally, or alternatively, the comparison component 124 may be configured to generate a ranking of document portions and/or documents based on breadth scores (e.g., raw breadth scores, bounded scores, inverted scores, etc.) to display the document portions and/or documents on a user interface according to the rank.

As shown in FIG. 2, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface(s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2 illustrates a component diagram of example components 200 of a remote computing resource 104 for the document analysis platform. The remote computing resource 104 may include one or more components such as, for example, one or more processor(s) 116, one or more network interfaces 118, and/or computer-readable media 120. The computer-readable media may include one or more components, such as, for example, a scoring component 122, a comparison component 124, a user interface generation component 220, and/or one or more data stores 126. Some or all of the components and functionalities may be configured to communicate with each other.

The data store(s) 126 may be a secure data store accessible by the system and utilized to store data corresponding to IP data 202 including one or more company portfolio(s) 204 and/or one or more IP assets 206, word weight data 208, training data 210, historical data 212, pre-processing data 214, one or more scoring formulas 216, and/or one or more ML models 218. The IP assets 206 may include set(s) of IP asset(s), such as, for example, a user determined set (e.g., comprised of IP assets selected by a user), a set associated with a particular market sector, a set associated with a particular technology category, and/or the like. Additionally, or alternatively, the IP asset(s) may include a singular IP asset, and/or any configuration of IP assets. The word weight data 208 may include word weights associated with individual technology areas, such as, for example, CPC codes, and/or user configured data sets, such as, for example, documents determined to be similar to a given document. It should be understood that determinations, generations, and/or other analysis performed with reference to given technology areas may also be performed with respect to any data set of documents. Word weights for each word occurring in a given technology area may be determined for each technology area and stored as word weight data 208 for later use. Additionally, or alternatively, the word weight data 208 may include word weights associated with the technology areas at given points in time. That is, first word weights associated with a given technology area may be different than second word weights associated with the given technology area at different points in time. For example, a first document having a first priority date may be assigned the first word weights and a second document having a second priority date may be assigned the second word weights, this is based on the documents identified as priority documents (e.g., having a priority date that precedes a document under analysis) that are associated with a technology area. In some examples, the word weights may be determined using the one or more ML model(s) 218, as described in more detail below. The training data 210 may be configured to train the ML model(s) 218 to generate an output representing word weights for a given document that is input to the ML model 218. In some examples, the training data 210 may be determined based on the analysis techniques described herein and/or based on prior outputs of the ML model. In some examples, the historical data 212 may include the prior outputs of the ML model that is utilized to generate training data 210 (e.g., configured as a feedback loop for the ML model(s) 218). Additionally, or alternatively, the historical data 212 may include historical litigation data associated with the IP asset(s) 206, previous breadth scores associated with the IP asset(s) 206, and/or previous litigation likelihoods associated with the IP asset(s) 206. The pre-processing data 216 may be configured to filter documents from a data repository (e.g., the data store 126 and/or one or more remote data stores) for pre-processing to identify those that are suitable for further analysis and to prepare the content of the documents for analysis. In some examples, the pre-processing data 216 may include natural language processing (NLP) data and/or additional information for pre-processing the documents, such as, for example, information related to punctuation removal, stop word removal, stemming/lemmatization, removal of alphanumeric and numeric, removal of duplicate words, and/or any combination thereof. The scoring formula(s) may include one or more formulas utilized to generate word weights for the technology area(s). In some examples, the word weights associated with a given technology category may be generated by any one of the following scoring formula(s) 216:

$$Word\ Weight = 1 - \frac{Count\ D_t}{N_t} \tag{1}$$

$$Word\ Weight = 1 - \sqrt[3]{\frac{Count\ D_t}{N_t}} \tag{2}$$

$$Word\ Weight = \left| log\left( \sqrt[3]{\frac{Count\ D_t}{N_t}} \right) \right| \tag{3}$$

where Count $D_t$ represents the number of patents within a given technology area and/or CPC t containing a given word and/or term D, and $N_t$ may represent all of the patents within the given CPC t.

In some examples, the scoring component 122 may include various sub-components, such as, a pre-processing component 222, a frequency component 224, a weighting component 226, an aggregation component 228, and/or a training component 230. Additionally, or alternatively, the comparison component 124 may include various sub-components, such as, a probability component 232, a ranking component 234, and/or a vector component 236.

As mentioned with respect to FIG. 1, the scoring component 122 may be configured to pre-process one or more documents to generate one or more processed document portions. In some examples, one or more processed document portions may be stored in association with the IP data 202. Additionally, or alternatively, the pre-processing component 222 may be configured to pre-process the documents and generate the processed document portions. In some examples, the documents may be an IP asset 206, and the document portions may be claims (e.g., patent claims). Various pre-processing techniques may be leveraged, such as, for example, natural language processing (NLP) and/or the like. Pre-processing may modify the document portions by standardizing the content and removing content that could negatively affect subsequent analysis through techniques such as, for example, punctuation removal, stop word removal, stemming/lemmatization, removal of alphanumeric and numeric, removal of duplicate words, and/or any combination thereof.

Additionally, or alternatively, the pre-processing component 222 may be configured to pre-process the documents to identify elements within the processed document portions. In some examples, an element may correspond to a sequence of any number of words (e.g., an n-gram) determined using natural language processing. For example, elements may be determined based at least in part on a natural language processing (NLP) grammar. The NLP grammar may be configured to identify the elements of the claim and/or parse the claim elements to generate an element tree, as described in more detail below with respect to FIG. 5A. For example, the element tree may be generated using an NLP parse. In some examples, the NLP grammar may employ a natural language toolkit (NLTK), such as, for example, Scikit-learn. The NLTK may be supplied specific grammar configured to identify claim elements (e.g., grammar utilized to identify noun elements), and may process a document and/or document portion to identify elements and/or produce the element tree. Additionally, or alternatively, the NLP may be supplied any configuration of grammar (e.g., patent specific grammar, etc.).

The scoring component 122 may also be configured to determine word frequencies for individual words and/or elements in a given document portion and/or processed document portion. Word frequencies may be determined for each word in a given document based on a similarity analysis, such as, for example, documents determined to be similar to a given document, documents included in a technology area associated with the given document, documents determined to be similar to a given document based on a generative AI, and/or the like. In some examples, the technology area for a given document may be determined based on a CPC code associated with the given document. A given CPC code may include a number of documents including, for example, published patent applications, issued patents, expired patents, and/or the like. In some examples, the number of documents in a given CPC code may be less than a threshold number, and the scoring component 122 may adjust the technology area to include additional similar technology areas, or to a broader technology area that encompasses the original technology area. Additionally, or alternatively, the number of documents in a given CPC code may be greater than a threshold number, and the scoring component 122 may adjust the technology area to exclude similar technology areas, or to a narrower technology area than the original technology area. The word frequencies for individual words in a given document portion and/or processed document portion, associated with a particular technology area, may be determined based on an analysis of the occurrences of such words in additional documents determined to be associated with the particular technology area.

In some examples, the frequency component 224 may be configured to determine the word frequencies for the individual words and/or elements in a given document portion and/or processed document portion. The individual word frequencies may be utilized to generate word weights for a given technology area. The frequency component 224 may determine the frequency that the individual words in a particular document portion are found throughout an entire corpus of document portions in a technology area (e.g., a CPC code) that is associated with the particular document portion.

The scoring component 122 may also be configured to generate word weights associated with a given technology area. The word weights may be based on the frequency that the individual words in a particular document portion are found throughout an entire corpus of document portions in a technology area (e.g., a CPC code) that is associated with the particular document portion.

In some examples, the weighting component 226 may be configured to generate the word weights associated with a given technology area. For example, the word frequencies determined by the frequency component 224 may be leveraged by the weighting component 226 to generate the word weights based on one or more formula(s). In some instances, a word weight for an individual word may be based on 1 minus the quotient of the number of documents in a given technology area that contain the individual word divided by the total number of documents in the given technology area. Additionally, or alternatively, a word weight for an individual word may be based on 1 minus the cube root of the quotient of the number of documents in a given technology area that contain the individual word divided by the total number of documents in the given technology area. Additionally, or alternatively, a word weight for an individual word may be based on the absolute value of the logarithm of the cube root of the quotient of the number of documents in a given technology area that contain the individual word divided by the total number of documents in the given technology area. For example, the word weights associated with a given technology category may be generated by any one of the following formula(s):

$$\text{Word Weight} = 1 - \frac{\text{Count } D_t}{N_t} \tag{1}$$

$$\text{Word Weight} = 1 - \sqrt[3]{\frac{\text{Count } D_t}{N_t}} \tag{2}$$

$$\text{Word Weight} = \left| \log\left( \sqrt[3]{\frac{\text{Count } D_t}{N_t}} \right) \right| \tag{3}$$

where Count $D_t$ represents the number of patents within a given technology area and/or CPC t containing a given word and/or term D, and $N_t$ may represent all of the patents within the given CPC t.

With this calculation, a first word determined to be a common word in the given technology area may receive a lower word weight, and a second word determined to be a rare word (e.g., an uncommon word) in the given technology area may receive a higher word weight. For example, words may be measured on a scale from common to rare. Rare words have a lower word frequency (e.g., occurring less often in documents of a given technology area), which may indicate that this word is more restrictive and thus may be given a higher weight than a word having a higher word frequency. Additionally, or alternatively, common words have a higher word frequency (e.g., words occurring more frequently in documents of a given technology area), which may indicate that the word is broader and thus may be given a lower weight than a word having a lower word frequency.

The scoring component 122 may also be configured to generate word scores for the individual words in a given document portion and/or processed document portion. In some examples, the aggregation component 228 may be configured to generate the word scores for the individual words in a given document portion and/or processed document portion. For example, the aggregation component 228 may generate the word scores by applying the word weights to the respective words in a given document portion and/or processed document portion.

The scoring component 122 may also be configured to generate a raw breadth score (also referred to herein as a preliminary breadth score) for a given document portion, processed document portion, and/or document. Breadth score calculation is performed within the context of the other documents that predate a given document and/or are associated with the same or a similar technology area to the given document. This provides dynamic word weighting and scoring based on technology area of a given document under analysis and the priority date of such a document by measuring word frequencies in a given technology area of only documents that may be leveraged as prior art against a document under analysis. In some examples, the aggregation component 228 may be configured to generate the raw breadth score for a given document portion, processed document portion, and/or document. Each document portion may be associated with its own raw breadth score. For example, the word scores for the individual words included in a given document portion may be summed to determine the raw breadth score. In some examples, the raw breadth score may be an unbounded number ranging from 0 to infinite. In some examples, the raw breadth scores corresponding to document portions of a given document may be further aggregated to determine a raw breadth score of the document.

The scoring component 122 may also be configured to generate a bounded breadth score (also referred to herein as a normalized score and/or bounded score) for a given document portion, processed document portion, and/or document. In some examples, the aggregation component 228 may be configured to generate the bounded breadth score for a given document portion, processed document portion, and/or document. For example, the aggregation component 228 may be configured to generate a bounded breadth score by normalizing a raw breadth score (e.g., an unbounded score). That is, the aggregation component 228 may generate a bounded breadth score, ranging on a bounded scale (e.g., 0-100), based on normalizing the raw breadth score according to any normalization equation, function, and/or formula. In some examples, the bounded breadth scores corresponding to document portions of a given document may be further aggregated to determine a bounded breadth score of the document.

The scoring component 122 may also be configured to generate an inverted breadth score (also referred to herein as an overall breadth score, inverted score, claim score, and/or breadth score) for a given document portion. In some examples, the aggregation component 228 may be configured to generate the inverted breadth score for a given document portion. For example, the aggregation component 228 may be configured to generate an inverted breadth score by inverting the bounded breadth score. That is, the aggregation component 228 may generate an inverted breadth score, ranging on the bounded scale associated with a bounded score (e.g., 0-100), based on inverting the bounded breadth score according to the bounded scale. For example, the inverted breadth score of a bounded breadth score of 75 on the bounded scale of 0-100 may be 25. That is, the inverted breadth score may be the sum of the value of the upper bound of the bounded scale (e.g., 100) minus the bounded breadth score. In some examples, the inverted breadth scores corresponding to document portions of a given document may be further aggregated to determine an inverted breadth score of the document. In some examples, the inverted breadth score may be representative of the claim score for a given document portion and/or the document score for a given document.

Additionally, or alternatively, one or more ML models 218 may be generated and/or trained to generate the word weights associated with a given technology area. In some examples, the scoring component 122 may be configured to generate one or more ML model(s) 218 and the training component 230 may be configured to generate training data 210 to train the ML model(s) 218. In some examples, the ML model(s) 218 may be generated and/or trained at a first time and stored in the data store 126 for use at a later, second time. That is, a trained ML model 218 may be configured to take a document and/or a document portion as input and output data representing word weights for a given technology area. Additionally, or alternatively, the training component 230 may be configured with a feedback loop, such that additional training data 210 may generated based on previous outputs of the ML models 218, and the ML models 218 may be further trained on such training data 210 to refine the data that is output.

The training component 230 may be configured to train the models 218 using machine-learning mechanisms. For example, a machine-learning mechanism can analyze training data 210 to train a data model 218 that creates an output, which can be one or more word weights for a technology area, one or more word weights at a given point in time, a raw breadth score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models 218 and/or scoring formulas 216 can be stored in the data store(s) 126 associated with remote computing resources 104 for use at a time after the data models 218 have been trained (e.g., at runtime). Additionally, the training component 230 may be configured to train the models 218 using the machine learning mechanisms based on various scoring formulas 216 (e.g., when outputting a breadth score). The training component 230 may generate training data 210 configured indicate word frequencies for individual words occurring in documents of a given technology area (e.g., a CPC code), at each technology area. That is, the training component 230 may be configured to train one or more models 218 such that the model(s) 218 may take a document, or a document portion thereof, as an input and the model(s) 218 may output word weights associated with the individual words in the document/document portion, word scores associated with the individual words in the document/document portions, and/or breadth scores associated with the individual document/document portions.

As previously described, the comparison component 124 may be configured to generate comparison data representing a likelihood of infringement of a given document in a district court action. In some examples, the comparison data may be stored in association with the IP asset(s) 206 in the data store 126. For example, a first IP asset 206 may be associated with a first technology area (e.g., a first CPC code). To determine a likelihood of infringement of the first IP asset 206 in a district court action, one or more second IP assets 206 associated with the first technology area and being associated with a litigation trial may be identified and further analyzed. That is, each of the second IP assets 206 (or portions therein) may undergo the analysis and scoring disclosed herein, such as, for example, pre-processing the second IP assets 206, determining word frequencies, generating word scores, generating raw breadth scores, bounded breadth scores, and/or inverted breadth scores. With the second IP assets 206 in the first technology area processed, the comparison component 124 and/or the probability component 232 may generate comparison data. The comparison data may be generated based on comparing the breadth scores of the second IP assets 206 with the breadth score of the first IP asset 206. In some examples, the comparison data may represent a likelihood of infringement of the first IP asset 206 in a district court action. Additionally, the outcome of the district court actions may be further utilized to generate the comparison data. That is, the comparison data may represent individual buckets or categories in which the first IP asset 206 may correspond to. For example, the comparison data may include four categories associated with the breadth scores, a first category for narrow breadth scores including documents (e.g., the IP assets 206), or portions thereof (e.g., the claims), having breadth scores ranging from 0-30, a second category for average breadth scores including documents, or portions thereof, having breadth scores ranging from 30-60, a third category for broad breadth scores including documents, or portions thereof, having breadth scores ranging from 60-80, and/or a fourth category for very broad breadth scores including documents, or portions thereof, having breadth scores ranging from 80-100. It should be understood that any number of categories/buckets may be utilized and associated with any range of breadth scores and the example categories described herein are exemplary. Additionally, or alternatively, each of the categories may include additional information indicating, for each individual category, a first percentage of the documents in a given category that were infringed and a second percentage of documents in the given category that were not infringed.

The comparison component 124 may also be configured to generate a graphical element configured to present the comparison data on a graphical user interface. The graphical element may be generated based on the comparison data, and may configured as a bar graph, line graph, pie chart, or the like. Take, for example, a graphical element configured as a bar graph. In some examples, the graphical element may include an x-axis associated with the claim breadth and/or claim score (also referred to herein as a breadth score) and/or a y-axis associated with the percentage of total distinct count of patents identified as both associated with a particular technology area and associated with a district court action. That is, this percentage may indicate a first percentage of the identified documents (e.g., patents) that were infringed and/or a second percentage of the identified documents that were not infringed. Additionally, the x-axis may be divided into categories and/or buckets associated with the breadth of a document portion and/or document and/or the claim score associated with a document portion and/or document, as previously described above with respect to the comparison data. Additionally, the comparison component 124 may generate one or more information windows associated with the IP asset 206 under analysis. In some examples, the information window(s) may correspond to the comparison data and/or the graphical element. That is, the information window(s) may include various information associated with a given IP asset 206 and/or a portion thereof, such as, for example, one or more identifiers associated with the IP asset 206 and/or a portion thereof, one or more breadth scores (e.g., claim scores, document scores, etc.) associated with the IP asset 206 and/or portions thereof, an infringement likelihood category, and/or an infringement prediction.

The comparison component 124 may also be configured to generate a ranking of document portions and/or documents based on breadth scores (e.g., raw breadth scores, bounded breadth scores, inverted breadth scores, etc.) to display the document portions and/or documents on a user interface according to the rank. In some examples, the ranking component 234 may be configured to generate the ranking of document portions and/or documents based on breadth scores (e.g., raw breadth scores, bounded scores, inverted scores, etc.) to display the document portions and/or documents on a user interface according to the rank. For example, the ranking component 234 may compare the claim score for two separate document portions and/or documents and determine that a first document portion has a more favorable (e.g., greater than) claim score than a second document portion. As such, a ranking may be determined where the first document is ranked first and the second document ranked second. When displayed on a user interface, the document portions and/or documents may be displayed according to the rank, where, in the above scenario, the first document would be presented at the top of the ranking and the second document is presented below the first document.

In an implementation, the ranking component 234 may additionally bin the results of the ranking into one of a set number of values. One binning implementation is by percentiles. Thus, the top 1% of the analyzed documents in terms of breadth would be all the given a rank of 100 even if the individual documents and/or document portions had slightly different breadth scores. The binning may divide the ranked documents and/or document portions into any number of different bins such as three different bins (e.g., high, medium, and low), 10 different bins, 100 different bins, or more. Thus, instead of 100,000 documents ranked from 1 to 100,000 in terms of breadth with each ranking being unique, each document and/or document portion may have a rank from 1 to 100 with several documents and/or document portions sharing each numerical level.

Some of the operations described above include summation, subtraction, multiplication, and/or division. The processor(s) 116 may implement these operations by use of floating point computations. Floating point is a formulaic representation that approximates a real number so as to support a trade-off between range and precision. A number is, in general, represented approximately to a fixed number of significant digits (the significand) and scaled using an exponent in some fixed base; the base for the scaling is normally two, ten, or sixteen. A number that can be represented exactly is of the following form: $significand \times base^{exponent}$ where significand is an integer base is an integer greater than or equal to two, and exponent is also an integer. The term floating point refers to the fact that a number's radix point (decimal point, or, more commonly in computers, binary point) can "float"; that is, it can be placed anywhere relative to the significant digits of the number. This position is indicated as the exponent component, and thus the floating-point representation is a form of scientific notation.

A floating-point system can be used to represent, with a fixed number of digits, numbers of different orders of magnitude. The result of this dynamic range is that the numbers that can be represented are not uniformly spaced; the difference between two consecutive representable numbers grows with the chosen scale. One example technique for floating point calculation is described in the IEEE 754 Standard. The current version, IEEE 754-2008 published in August 2008. The international standard ISO/IEC/IEEE 60559:2011 (with content identical to IEEE 754-2008) is published as ISO/IEC/IEEE 60559:2011 "Information technology—Microprocessor Systems—Floating-Point arithmetic."

A floating-point number consists of two fixed-point components, whose range depends exclusively on the number of bits or digits in their representation. The components linearly depend on their range, the floating-point range linearly depends on the significant range and exponentially on the range of exponent component, which attaches outstandingly wider range to the number. On an example computer system, a 'double precision' (64-bit) binary floating-point number has a coefficient of 53 bits (one of which is implied), an exponent of 11 bits, and one sign bit. Positive floating-point numbers in this format have an approximate range of $10^{-308}$ to $10^{308}$, because the range of the exponent is [−1022, 1023] and 308 is approximately $\log_{10}(2^{1023})$. The complete range of the format is from about $−10^{308}$ through $+10^{308}$ (see IEEE 754).

The number of normalized floating-point numbers in a system (B, P, L, U) where B is the base of the system, P is the precision of the system to P numbers, L is the smallest exponent representable in the system, and U is the largest exponent used in the system) is 2(B−1)(BP−1)(U−L+1)+1.

There is a smallest positive normalized floating-point number, Underflow level=UFL=BL which has a 1 as the leading digit and 0 for the remaining digits of the significand, and the smallest possible value for the exponent. There is a largest floating-point number, Overflow level=OFL=(1−B−P)(BU+1) which has B−1 as the value for each digit of the significand and the largest possible value for the exponent.

The comparison component 124 may also be configured to generate vector representations of documents (e.g., IP assets), document portions (e.g., claims, claim elements, etc.), and/or words. In some examples, the vector component 236 may be configured to generate the vector representations of documents (e.g., IP assets), document portions (e.g., claims), and/or words. For example, the vector component 236 may be configured to generate a vector representation of a document, a document portion, and/or a word and use the vector representation to identify documents, document portions, and/or words having similar vector representations. Techniques to generate vectors representing documents, document portions, and/or words may include vectorization techniques such as Doc2Vec, or other similar techniques. Additionally, or alternatively, techniques to generate vectors representing documents, document portions, and/or words may include a method that takes a document, document portion, and/or a word, such as an IP asset 206, a claim, and/or a claim element, and turns it into a vector form as a list of floating-point numbers based at least in part on the documents, document portions, and/or words text contents. This vector form may be called an embedding. This embedding may be used to calculate distance, and therefore similarity, between documents, document portions, and/or words. Additionally, or alternatively, the vector component 236 may be configured to utilize the vector representations of individual words to generate a vector representation of an element and/or a document portion. Techniques to generate vectors representing elements and/or document portions may include various vectorization techniques utilized to generate the vectors documents, document portions, and/or words, and may aggregate the data to generate a vector representing the element and/or document portion based on the aggregated vector representation of the words included in the element and/or document portion.

The comparison component 124 may also be configured to determine a similarity score between document(s) (e.g., IP assets), document portions (e.g., claims, claim elements, etc.), and/or words. For example, the comparison component 124 may utilize the vector representations to determine a similarity score between a first document, document portion, and/or word and a second document, document portion, and/or word. In some examples, the similarity score may be based at least in part on a distance between a first vector representation of the first document and a second vector representation of the second document. Additionally, or alternatively, the similarity score between two given documents, document portions, and/or words may be determined relative to additional distances between one or more additional documents, document portions, and/or words under analysis.

Additionally, or alternatively, the comparison component 124 may be configured to determine similarity between two documents, document portions, and/or words using one or more generative artificial intelligence(s) (AI) and/or one or more ML models. For example, the comparison component 124 may be configured to determine a second word that is similar to a first word for word frequency calculation, scoring, and/or the like. That is, the comparison component 124 may be configured to determine a second word that is a synonym, hyponym, and/or a word within an ontology of a first word. For example, the comparison component 124 may take a first word in a first level of an ontology associated with the first word and may be configured to identify a second word in a second level of the ontology that is either more generic or less generic than the first level of the ontology. These second word(s) may then be utilized to determine word frequencies for the first word and/or in combination with the first word. Additionally, or alternatively, the comparison component 124 may utilize the vector representations and/or similarity scores associated with words to determine similar words for word frequency analysis.

The user interface generation component 220 may be configured to generate user interface element(s) and/or user interface pages described herein using data received from other components utilized by the system. In some examples, the user interface generation component 220 may be communicatively coupled to the other components stored thereon the computer-readable media. In some examples, the user interface generation component 220 may generate user interfaces configured to present information associated with particular document portions, documents, technology areas, and/or any other projects associated with a user account. Additionally, or alternatively, the user interface generation component 220 may generate user interfaces including confidential information and may be configured to be accessible by only users with predetermined qualifications. Example user interfaces that may be generated by the user interface generation component 220 are described in more detail below with respect to FIGS. 7-9.

FIG. 3 illustrates an example flow diagram of an example process 300 for generating a score for given a document portion. In some examples, the score may correspond to the claim score, document score, and/or breadth score as described above with respect to FIGS. 1 and 2. Additionally, or alternatively, the document may be an IP asset, such as, for example, an IP asset 206 and/or a document portion may be a claim, as described with respect to FIG. 2.

At 302, the process 300 may include identifying elements within a claim (e.g., document portion). The elements within the claim may be identified using pre-preprocessing techniques and/or NLP as described above with respect to FIGS. 1 and 2. Turning to FIG. 4, in which step 302 of process 300 is described in more detail with respect to FIG. 4.

FIG. 4 illustrates an example flow diagram of an example process 400 for generating a weighting tree. At step 402, the process 402 may include identifying the elements within a claim. As illustrated, step 402 is accompanied by an example document portion 404. As shown in example document portion 404, the elements of the claim are identified and represented as words surrounded by parenthesis (e.g., "(word)"). Additionally, for the purposes of explanation, each of the first occurrences of the elements are represented in bold font. That is, each unique element can be identified in the example document portion 404.

At step 406, the process 400 may include identifying a set of elements in the claim that are recitations of a previously named element. As illustrated, step 406 is accompanied by example document portion 408. As shown in example document portion 408, the set of elements that are recitations of a previously named element are identified and represented by underline font. For the purposes of explanation, these elements may be represented as the words surrounded by parenthesis and un-bolded.

At step 410, the process 400 may include identifying attachment adjustments in the claim. An attachment adjustment may include words that attach claim elements together (e.g., "and," "or," "attaching," "formed by," and/or the like). As illustrated, step 410 is accompanied by example document portion 412. As shown in example document portion 412, the attachment adjustments are identified and represented in italic font. The attachment identifiers may be leveraged later on to determine word scores, as described in more detail with respect to FIGS. 5A and 5B.

At step 414, the process 400 may include generating a tree of claim elements. In some examples, step 414 of process 400 may be a sub-process of step 304 of process 300 as described with respect to FIG. 3. Turning back to FIG. 3, at step 304, the process 300 may include determining word weights for a given technology category. In some examples, the claim and/or IP asset under analysis may indicate a technology category (e.g., a CPC code). Word weights for a technology area may be determined using various techniques. In some examples, a tree of claim elements may be leveraged to determine the word scores. Referring back to FIG. 4, at step 414, the process may include generating the tree of claim elements, which is described in more detail below with reference to FIGS. 5A and 5B.

Figure 5A:
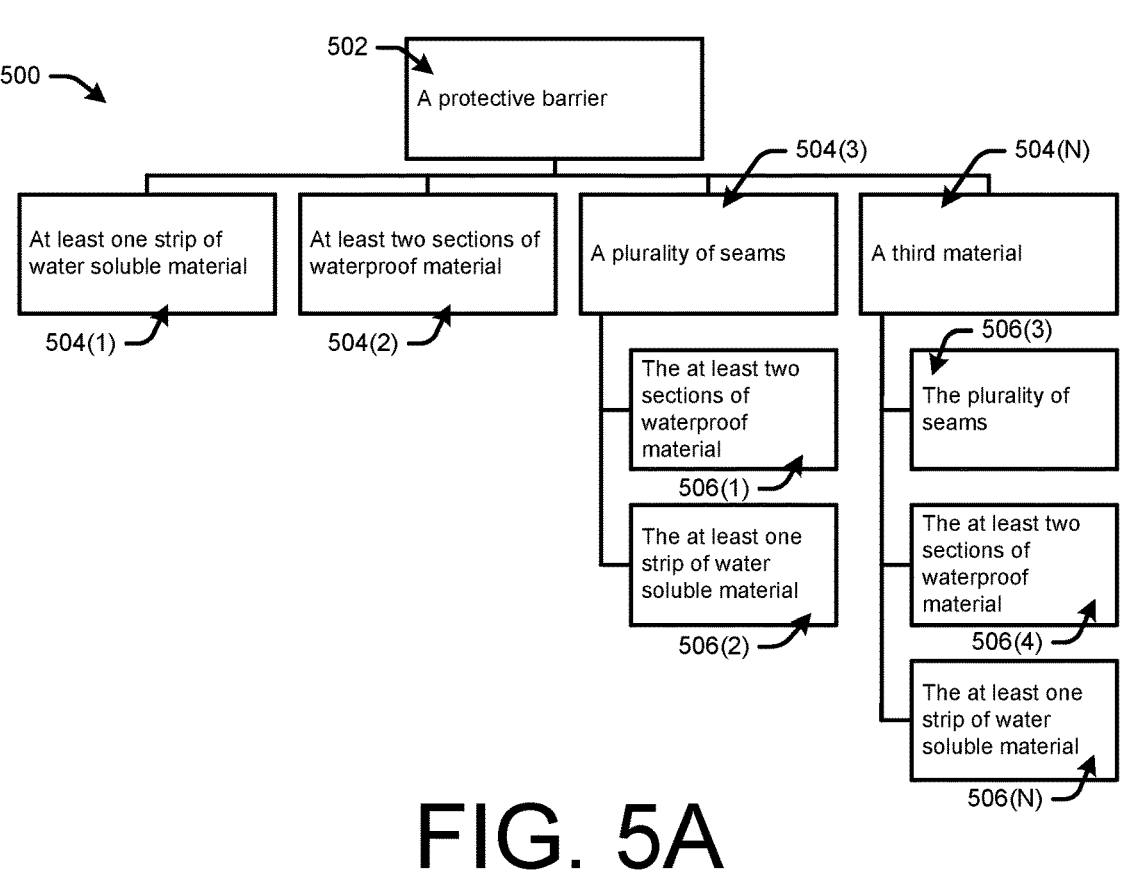
FIG. 5A illustrates an example element tree for an example document portion that may be used to generate a weighting tree.
Figure 5B:
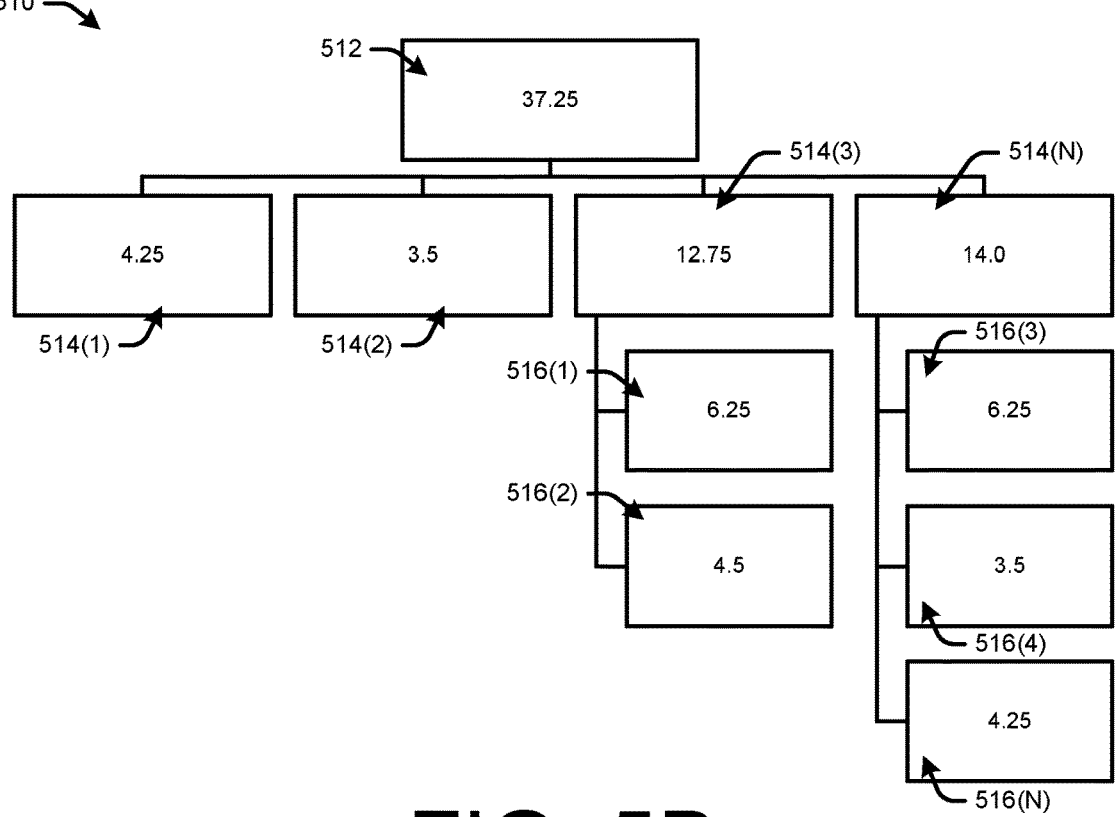
FIG. 5B illustrates an example weighting tree generated based on an element tree representing a document portion.

FIG. 5A illustrates an example element tree 500 for an example document portion that may be used to generate a scoring tree 510 as shown in FIG. 5B. In some examples, the element tree 500 may be generated by the pre-processing component 222, as described with respect to FIG. 2. For explanation purposes, the example element tree 500 is based on the example document portions 404, 408, 412, as described with respect to FIG. 4. In some examples, the element tree 500 may be generated as a result of the process 400, as described with respect to FIG. 4. For example, the element tree 500 may be generated based at least in part on a natural language processing (NLP) grammar. The NLP grammar may be configured to identify the elements of the claim and/or parse the claim elements to generate the element tree 500. For example, the element tree 500 may be generated using an NLP parse. In some examples, the NLP grammar may employ a natural language toolkit (NLTK), such as, for example, Scikit-learn. The NLTK may be supplied specific grammar configured to identify claim elements (e.g., grammar utilized to identify noun elements), and may process a document and/or document portion to produce the element tree 500. Additionally, or alternatively, the NLP may be supplied any configuration of grammar (e.g., patent specific grammar, etc.).

In some examples, the element tree 500 may include a root node 502, one or more branch nodes 504(1)-(N), and/or one or more leaf nodes 506(1)-(N), where N may be any integer greater than 1. In some examples, the root node 502 may correspond to the first identified claim element. Additionally, or alternatively, the branch nodes 504 may correspond to the additional unique claim elements identified in step 402 of process 400, as described with respect to FIG. 4. Additionally, or alternatively, the leaf nodes 506 may correspond to the sets of elements that are recitations of a previously named element identified in step 406 of the process 400, and/or these leaf nodes 506 may be attached to the branch nodes 504 based on the attachment adjustments identified in step 410 of the process 400, as described with respect to FIG. 4. Individual ones of the words in individual ones of the nodes 502, 504, 506 may undergo the frequency and/or word weighting analysis, as described with respect to FIG. 2.

The frequency for all of the non-stop words in a given element, such as, for example, element represented by 504(1). In such an example, the words "one," "strip," "water," "soluble," and/or "material" may be identified as non-stop words. These words each have a corresponding word weight that may be adjusted based on the frequency of the occurrence of the word to generate word scores. Then, the word scores may be summed to generate the score for the element, as represented by 514(1) in FIG. 5B.

The frequency of individual words may be analyzed and measured in a time insensitive manner and/or in a time-sensitive manner, as described in more detail with respect to FIGS. 6A-6D. FIGS. 6A-6D illustrate example word frequency graphs. In some examples, the time scale may include intervals of days, weeks, months, years, etc. Additionally, or alternatively, the frequency scale may include more intervals than low, average, and high such that comprehensive analysis may be performed. FIG. 6A illustrates an example word frequency graph 600 for a low frequency word in a target technology area using time insensitive analysis. In some examples, the word frequency graph 600 may represent a low frequency word/term, represented by the frequency 602 remaining low from time t0 to t3. Additionally, or alternatively, a low frequency term may correspond to a rare word, as previously described. FIG. 6B illustrates another example word frequency graph 610 for a high frequency word in a target technology area using time insensitive analysis. In some examples, the word frequency graph 610 may represent a high frequency word/term, represented by the frequency 612 remaining high from time t0 to t3. Additionally, or alternatively, a high frequency word may correspond to a common word, as previously described. FIG. 6C illustrates another example word frequency graph 620 for an increasingly common word/term in a target technology area using time-sensitive analysis. In some examples, the word frequency graph 620 may represent an increasingly common term, represented by the frequency 622 at time t0 being low and increasing over time to t3, where the term is now a high frequency term. Additionally, or alternatively, an increasingly common term may correspond to a word that was previously categorized as a rare word in a technology area, but overtime has become a common word in the technology area. FIG. 6D illustrates another example word frequency graph 630 for a deprecated word/term in a target technology area using time-sensitive analysis. In some examples, the word frequency graph 630 may represent a deprecated term, represented by the frequency 632 at time t0 being high and decreasing over time to t3, where the term is now a low frequency term. Additionally, or alternatively, a deprecated term may correspond to a word that was previously categorized as a common word in a technology area, but over time has become a rare word in the technology area. By using time-insensitive and/or time-sensitive analysis, such indications of low frequency terms, high frequency terms, increasingly common terms, and/or deprecated terms may be leveraged by the scoring component 122 when determining word frequencies, word weights, word scores, breadth scores, and/or the like, as described with respect to FIG. 2. For example, a breadth score may be modified to be broader if the corresponding document has an early filing date (e.g., T1) followed by an increase in term usage (e.g., FIG. 6C) and/or narrower if the corresponding document has an early filing date (e.g., T1) followed by a decrease in term usage (e.g., FIG. 6D).

As previously described, a word weight for an individual word may be based on 1 minus the quotient of the number of documents in a given technology area that contain the individual word divided by the total number of documents in the given technology area. Additionally, or alternatively, a word weight for an individual word may be based on 1 minus the cube root of the quotient of the number of documents in a given technology area that contain the individual word divided by the total number of documents in the given technology area. Additionally, or alternatively, a word weight for an individual word may be based on the absolute value of the logarithm of the cube root of the quotient of the number of documents in a given technology area that contain the individual word divided by the total number of documents in the given technology area. For example, the word weights associated with a given technology category may be generated by any one of the following formula(s):

$$\text{Word Weight} = 1 - \frac{\text{Count } D_t}{N_t} \qquad (1)$$

$$\text{Word Weight} = 1 - \sqrt[3]{\frac{\text{Count } D_t}{N_t}} \qquad (2)$$

$$\text{Word Weight} = \left| \log\left( \sqrt[3]{\frac{\text{Count } D_t}{N_t}} \right) \right| \qquad (3)$$

where Count $D_t$ represents the number of patents within a given technology area and/or CPC t containing a given word and/or term D, and $N_t$ may represent all of the patents within the given CPC t.

With this calculation, a first word determined to be a common word in the given technology area may receive a lower word weight, and a second word determined to be a rare word (e.g., an uncommon word) in the given technology area may receive a higher word weight. For example, words may be measured on a scale from common to rare. Rare words have a lower word frequency (e.g., occurring less often in documents of a given technology area), which may indicate that this word is more restrictive and thus may be given a higher weight than a word having a higher word frequency. Additionally, or alternatively, common words have a higher word frequency (e.g., words occurring more frequently in documents of a given technology area), which may indicate that the word is broader and thus may be given a lower weight than a word having a lower word frequency.

FIG. 5B illustrates an example scoring tree 510 generated based on further analysis of an element tree 500 representing a document portion. In some examples, the scoring tree 510 may be generated by the scoring component 122 and/or the aggregation component 228, as described with respect to FIG. 2. For explanation purposes, the example scoring tree 510 is based on the example document portions 404, 408, 412, as described with respect to FIG. 4, and/or the element tree 500, as described with respect to FIG. 5A.

In some examples, the scoring tree 510 may include a root node 512, one or more branch nodes 514(1)-(N), and/or one or more leaf nodes 516(1)-(N), where N may be any integer greater than 1. In some examples, root node 512 of the scoring tree 510 may represent an aggregation of the word scores for the individual words included in the root node 502, branch nodes 504, and/or leaf nodes 506 of the element tree 500. That is, the score indicated by the root node is the claim score and/or breadth score for the given claim under analysis. Additionally, or alternatively, branch nodes 504 of the scoring tree 510 may represent an aggregation of the word scores for the individual words included in a given branch node 514 and/or the leaf nodes 516 that stem from the given branch node 514. As illustrated, the scores of the leaf nodes 516(1), 516(2) stemming from branch node 514(3) may be aggregated to determine the score for branch node 514(3). In some examples, frequency analysis may be performed on a per-word and/or per-element basis. That is, individual words may undergo frequency analysis and/or full elements including multiple words may under frequency analysis. That is, the scoring tree 510 may be generated following a traversal of the element tree 500.

Referring back to FIG. 3, step 304 is accompanied by word weight formulas 306 that may be used to determine the word weights, as previously described.

At step 308, the process 300 may include generating a raw claim score based on claim elements and word weights. For example, the word weights, determined according to one of the formulas 306, may be applied to the individual words in the nodes 502, 504, 506 to determine word scores, as represented by the scoring tree 510 in FIG. 5B. Raw claim score calculation is performed within the context of the other documents that predate a given document and/or are associated with the same or a similar technology area to the given document. This provides dynamic word weighting and scoring based on technology area of a given document under analysis and the priority date of such a document by measuring word frequencies in a given technology area of only documents that may be leveraged as prior art against a document under analysis. Each document portion may be associated with its own raw claim score. For example, the word scores for the individual words included in a given document portion may be summed to determine the raw claim score. In some examples, the raw claim score may be an unbounded number ranging from 0 to infinite. In some examples, the raw breadth scores corresponding to document portions of a given document may be further aggregated to determine a raw breadth score of the document.

At 310, the process 300 may include normalizing the raw claim score to generate a bounded claim score. For example, a bounded breadth score may be generated by normalizing a raw claim score (e.g., an unbounded score). That is, a bounded claim score may be generated, ranging on a bounded scale (e.g., 0-100), based on normalizing the raw claim score according to any normalization equation, function, and/or formula. In some examples, the bounded claim scores corresponding to document portions of a given document may be further aggregated to determine a bounded breadth score of the document.

At 312, the process 300 may include inverting the bounded claim score to generate a final claim score. For example, an inverted breadth score may be generated by inverting the bounded claim score. That is, an inverted breadth score may be generated, ranging on the bounded scale associated with a bounded score (e.g., 0-100), based on inverting the bounded claim score according to the bounded scale. For example, the inverted claim score of a bounded claim score of 75 on the bounded scale of 0-100 may be 25. That is, the inverted claim score may be the sum of the value of the upper bound of the bounded scale (e.g., 100) minus the bounded claim score. In some examples, the inverted claim scores corresponding to document portions of a given document may be further aggregated to determine an inverted breadth score of the document.

FIGS. 7-9 illustrate conceptual diagrams of example user interface(s) 700-900 that may receive user input and utilize the document analysis platform to perform the various operations described above with respect to FIGS. 1-6D and/or the various operations described below with respect to FIGS. 10 and 11. The user interface(s) 700-900 may be generated by the user interface generation component 220 as described with respect to FIG. 2 above. The user interface(s) 700-900 may be displayed on a display of an electronic device, such as, for example, the electronic device 102 as described with respect to FIG. 1 above. While example user interface(s) 700-900 are shown in FIGS. 7-9, the user interface(s) 700-900 are not intended to be construed as a limitation, and the user interface(s) 700-900 may be configured to present any of the data described herein.

FIG. 7 illustrates an example user interface 700 configured to display one or more indications of document portions in association with one or more scores. In some examples, the user interface 700 may correspond to the claim score page, as described herein. The claim user interface 700 may be generated and populated as a result of the breadth scoring techniques disclosed herein. The user interface 700 may include a listing of one or more claims including various information associated with the claims, such as, for example, a first identifier 702 associated with a claim, a second identifier 704 associated with the patent including the claim, a score 706 associated with the claim (e.g., the claim score), a ranking 708 of the claim with respect to the listing of the claims, a portion of the claim language 710 of the claim, and/or a selection box 712 associated with the claim. Additionally, or alternatively, the user interface 700 may include one or more actionable elements, such as, for example, a patent score element 714 and/or an infringement likelihood element 716. The claim listings may be presented in individual cells dividing the individual listings into rows. Each row may be selectable for further analysis of the associated claim via the selection box 712. The user interface 700 may be displayed on a display of an electronic device associated with a user account, such as, for example, the electronic device 102 as described with respect to FIG. 1 above. In some examples, selection of the selection box 712 of a given claim may cause the electronic device to cease display of the user interface 700 and cause one or more additional user interfaces 800, 900 to be displayed on the display of the electronic device. For example, following selection of the selection box 712 for a given claim, a user may select the patent score element 714 and/or the infringement likelihood element 716 to cause the user interface 800 presenting the patent score page and/or the user interface 900 presenting the infringement likelihood page to be displayed.

FIG. 8 illustrates another example user interface 800 configured to display one or more documents in association with one or more scores. In some examples, the user interface 800 may correspond to the patent score page, as described herein. The claim user interface 800 may be generated and populated as a result of the breadth scoring techniques disclosed herein. The user interface 800 may include a listing of one or more patents including various information associated with the patents, such as, for example, an identifier 802 associated with the patent (e.g., an application number, a patent number, a user specified identifier, etc.), a score 804 associated with the document (e.g., the document score), a ranking 806 of the patent with respect to the listing of the patents, a portion of the highest score claim language 808 (e.g., the claim with the highest claim breadth score), and/or a selection box 810 associated with the patent. Additionally, or alternatively, the user interface 800 may include one or more actionable elements, such as, for example, a patent score element 812 and/or an infringement likelihood element 814. The patent listings may be presented in individual cells dividing the individual listings into rows. Each row may be selectable for further analysis of the associated document via the selection box 810. The user interface 800 may be displayed on a display of an electronic device associated with a user account, such as, for example, the electronic device 102 as described with respect to FIG. 1 above. In some examples, selection of the selection box 810 of a given claim may cause the electronic device to cease display of the user interface 800 and cause one or more additional user interfaces 700, 900 to be displayed on the display of the electronic device. For example, following selection of the selection box 810 for a given claim, a user may select the claim score element 812 and/or the infringement likelihood element 814 to cause the user interface 700 presenting the claim score page and/or the user interface 900 presenting the infringement likelihood page to be displayed.

FIG. 9 illustrates another example user interface 900 configured to display a graphic representing a likelihood of infringement of a given document portion in a district court action based on the claim score and/or additional information associated with the document portion. In some examples, the user interface 900 may correspond to the infringement likelihood page, as described herein. The user interface 900 may include a graphical element 902 associated with a given document (e.g., patent) and/or document portion (e.g., claim), and/or an information window 904 associated with the given document and/or document portion. The user interface 900 may be displayed on a display of an electronic device associated with a user account, such as, for example, the electronic device 102 as described with respect to FIG. 1 above. In some examples, the user interface 900 may be displayed as a result of selection of a selection box 712, 810 and/or one or more actionable elements with respect to a document portion and/or document on a user interface 700, 800, as described with respect to FIGS. 7 and 8.

As previously described, the document analysis platform may be configured to generate comparison data representing a likelihood of infringement of a given document in a district court action. For example, a first document may be associated with a first technology area (e.g., a first CPC code). To determine a likelihood of infringement of the first document in a district court action, one or more patents associated with the first technology area and being associated with a litigation trial may be identified and further analyzed. That is, each of the identified patents (or portions therein) may undergo the analysis and scoring disclosed herein, such as, for example, pre-processing the patents, determining word frequencies, generating word scores, generating raw breadth scores, bounded breadth scores, and/or inverted breadth scores. With the identified patents in the first technology area processed, the document analysis platform may generate comparison data. The comparison data may be generated based on comparing the breadth scores of the identified patents with the breadth score of the first document. In some examples, the comparison data may represent a likelihood of infringement of the first document in a district court action. Additionally, the outcome of the district court actions may be further utilized to generate the comparison data.

The document analysis platform may also be configured to generate a graphical element 902 configured to present the comparison data on the graphical user interface 900. The graphical element 902 may be generated based on the comparison data, and may configured as a bar graph, line graph, pie chart, or the like. Take, for example, a graphical element 902 configured as a bar graph, as illustrated. In some examples, the graphical element 902 may include an x-axis associated with the claim breadth 906 and/or claim score 908 (also referred to herein as a breadth score) and/or a y-axis associated with the percentage of total distinct count of patents identified 910 as both associated with a particular technology area and associated with a district court action. That is, this percentage 910 may indicate a first percentage of the identified documents (e.g., patents) that were infringed and/or a second percentage of the identified documents that were not infringed. Additionally, the x-axis may be divided into categories and/or buckets associated with the breadth of a document portion and/or document and/or the claim score associated with a document portion and/or document. That is, the comparison data may represent individual buckets or categories in which the first document may correspond to. For example, the comparison data and/or the graphical element 902 may include four categories associated with the breadth scores, a first category for narrow claim breadth 906 including documents (e.g., the patents), or portions thereof (e.g., the claims), having claim scores 908 ranging from 0-30, a second category for average claim breadth 906 including documents, or portions thereof, having claim scores 908 ranging from 30-60, a third category for broad claim breadth 906 including documents, or portions thereof, having claim scores 908 ranging from 60-80, and/or a fourth category for very broad claim breadth 906 including documents, or portions thereof, having claim scores 908 ranging from 80-100. It should be understood that any number of categories/buckets may be utilized and associated with any range of claim scores and the example categories described herein are exemplary.

Additionally, or alternatively, the graphical element 902 may be further understood with reference to the key 912 which indicates, for each individual category described above, a first percentage of the documents in a given category that were infringed (illustrated by the white boxes of the bar graph) and a second percentage of documents in the given category that were not infringed (illustrated by the black boxes of the bar graph).

The information window 904 may include one or more indications and/or information associated with the given document and/or document portion under analysis, such as, for example, an indication of the claim number 914, an indication of the patent number 916, a score 918 of the document and/or document portion (indicating which claim score 908 category the document/document portion falls under), a category 920 associated with the document and/or document portion (e.g., corresponding to the measure of claim breadth 906), and/or a likelihood 922 associated with the document and/or document portion. In some examples, the likelihood 922 may represent a likelihood of infringement of the document and/or document portion in a district court action. In some examples, the likelihood 922 may correspond to the category 920 in which the document and/or document portion is associated with. For example, claim 1 has a score 918 of 85, which falls in the claim score 908 range of 80-100 which corresponds to the very broad category 920 of the claim breadth 906. In the very broad category 920 we can see that for this particular technology area associated with the document and/or document portion, there is a 61.80% likelihood of infringement. While the example likelihoods of infringement are displayed on the graphical element 902 of FIG. 9, it should be understood that these percentages are not to be construed as limiting and are for the purposes of explanation. That is, the graphical element 902 may include any graph for presenting the comparison data, and number of bars in a bar graph, any percentages for likelihoods based on technology area and/or priority date of a given document and/or document portion under analysis, and/or any number of categories for the x-axis.

Additionally, or alternatively, the user interface 900 may include an back element 924 configured such that when selected, may cause the electronic device to display the user interface 700 representing the claim score page and/or the user interface 800 representing the document score page.

FIGS. 10 and 11 illustrate example processes 1000 and 1100 associated with the document analysis platform. The processes 1000 and 1100 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes 1000 and 1100 are described with reference to the environments, architectures and systems described in the examples herein, such as, for example those described with respect to FIGS. 1-9, although the processes may be implemented in a wide variety of other environments, architectures and systems.

FIG. 10 illustrates an example flow diagram of an example process 1000 for generating a breadth score for portions of a first document using word scores generated for the individual words based on word weights generated according to the word frequencies, of the words found in the first document portions, with respect to their occurrences in second documents that predate the first document. The order in which the operations or steps are described is not intended to be construed as a limitation, and any number of the described operations may be combined in any order and/or in parallel to implement process 1000. The operations described with respect to the process 1000 are described as being performed by an electronic device and/or a remote computing resource associated with the document analysis platform. However, it should be understood that some or all of these operations may be performed by some or all of components, devices, and/or systems described herein.

At block 1002, the process 1000 may include receiving a corpus of documents. In some examples, the corpus of documents may comprise at least a first document including first text. Additionally, or alternatively, the first document may be associated with a first technology area. Additionally, or alternatively, the first document may have a first priority date.

At block 1004, the process 1000 may include pre-processing the first document to generate one or more first processed document portions from the first document. In some examples, the one or more first processed document portions may include first words from the first text.

At block 1006, the process 1000 may include identifying second documents associated with the first technology area and/or having a second priority date that predates the first priority date. In some examples, individual ones of the second documents may include second text.

At block 1008, the process 1000 may include pre-processing the second documents to generate one or more second processed document portions from individual ones of the second documents.

At block 1010, the process 1000 may include determining word frequencies for individual ones of the first words. In some examples, a first word frequency of the word frequencies may be based at least in part on a first number of the second documents that include a first word of the first words and/or a second number representing a total number of the second documents associated with the first technology area.

At block 1012, the process 1000 may include generating word weights associated with the first technology area. In some examples, generating the word weights may be based at least in part on the word frequencies for the individual ones of the first words. Additionally, or alternatively, the word weights may be generated based at least in part on the word weight formulas described herein. Additionally, or alternatively, the word weights may be generated based at least in part on an ML model, as described herein.

At block 1014, the process 1000 may include generating word scores for the first words included in the first processed document portions. In some examples, generating the word scores for the first words may be based at least in part on assigning the word weights to the first words.

At block 1016, the process 1000 may include generating a breadth score for individual ones of the first processed document portions. In some examples, the breadth score for individual ones of the first processed document portions may be based at least in part on a sum of the word scores associated with the first words included in the individual ones of the first processed document portions.

At block 1018, the process 1000 may include generating a graphical user interface (GUI) configured to display on a computing device. In some examples, the GUI may be configured to display at least one breadth score for at least one of the first processed document portions in proximity to a generated document identification number associated with the one of the first processed document portions. In some examples, the GUI may correspond to the GUI 700 and/or the GUI 800, as described with respect to FIGS. 7 and 8, respectively.

Additionally, or alternatively, the process 1000 may include generating a bounded breadth score based at least in part on normalizing the breadth score. In some examples, the bounded breadth score may be greater than or equal to a minimum score and/or less than or equal to a maximum score. Additionally, or alternatively, the process 1000 may include generating an inverted breadth score based at least in part on inverting the bounded breadth score. Additionally, or alternatively, the process 1000 may include causing the GUI to display at least the inverted breadth score for the at least one of the first processed document portions in proximity to the generated document identification number.

Additionally, or alternatively, the process 1000 may include determining the first word frequency associated with the first word based at least in part on taking a cube root of a quotient of the first number of the second documents that include the first word divided by the second number representing the total number of the second documents associated with the first technology area. Additionally, or alternatively, the process 1000 may include generating a first word weight associated with the first technology area based at least in part on the first word frequency. In some examples, the first word weight may be weighted higher than a second word weight associated with a second word included in the first text based at least in part on determining that the first word frequency is less than a second word frequency associated with the second word. Additionally, or alternatively, the first word weight may be weighted lower than the second word weight associated with the second word based at least in part on determining that the first word frequency is greater than the second word frequency In some examples, the word scores may be first word scores. Additionally, or alternatively, the process 1000 may include identifying one or more patents associated with a litigation trial. In some examples, the one or more patents may be associated with the first technology area. Additionally, or alternatively, the process 1000 may include generating second word scores for second words included in individual ones of the patents based at least in part on assigning the word weights to the second words. Additionally, or alternatively, the process 1000 may include generating additional breadth scores for individual ones of the patents based at least in part on a sum of the second word scores associated with the second words included in the individual ones of the patents. Additionally, or alternatively, the process 1000 may include generating comparison data based at least in part on comparing the breadth score to the additional breadth scores. In some examples, the comparison data may represent a likelihood of infringement of the first document in a district court action. Additionally, or alternatively, the process 1000 may include generating a graphical element to be displayed on the GUI, the graphical element being configured to present at least the one breadth score for the at least one of the first processed document portions in association with one or more groups that are correlated with one or more likelihoods of infringement in a district court action based at least in part on the comparison data. Additionally, or alternatively, the process 1000 may include causing the GUI to display the graphical element. In some examples, the graphical element may correspond to the graphical element 902 as described with respect to FIG. 9.

In some examples, the word frequencies may be first word frequencies, the word weights may be first word weights, and/or the first technology category is associated with a first cooperative patent classification (CPC) code. Additionally, or alternatively, the process 1000 may include determining that the total number of the second documents included in the first technology area does not satisfy a threshold number of documents. Additionally, or alternatively, the process 1000 may include determining a second technology area associated with the first document. In some examples, the second technology area may be different from the first technology area and having a second CPC code that is different from the first CPC code. Additionally, or alternatively, the process 1000 may include identifying third documents associated with the second technology area and having the second priority date that predates the first priority date. Additionally, or alternatively, the process 1000 may include determining that the total number of the third documents included in the second technology area satisfies the threshold number of documents. Additionally, or alternatively, the process 1000 may include determining second word frequencies for individual ones of the first words. Additionally, or alternatively, the process 1000 may include generating second word weights associated with the second technology area based at least in part on the second word frequencies. Additionally, or alternatively, the process 1000 may include generating the word scores for the first words included in the first processed document portions based at least in part on assigning the second word weights to the first words.

Additionally, or alternatively, the process 1000 may include identifying, from the second text associated with the second documents, one or more common words associated with the first technology area based at least in part on the word frequencies, the common words being assigned a first word weight, and/or one or more rare words associated with the first technology area based at least in part on the word frequencies, the rare words being assigned a second word weight that is different from the first word weight. In some examples, generating the word weights associated with the first technology area may be based at least in part on identifying the one or more common words and the one or more rare words from the second text associated with the second documents.

Additionally, or alternatively, the process 1000 may include identifying, using natural language processing, a listing of stop words, duplicate words, and punctuation in the first text based at least in part on respective computer representations associated with the stop words, duplicate words, and/or punctuation. Additionally, or alternatively, the process 1000 may include removing the stop words, duplicate words, and punctuation from the first text.

FIG. 11 illustrates an example flow diagram of another example process 1100 for generating a breadth score for portions of a first document using word scores generated for the individual words based on word weights generated according to the word frequencies, of the words found in the first document portions, with respect to their occurrences in second documents that predate the first document. The order in which the operations or steps are described is not intended to be construed as a limitation, and any number of the described operations may be combined in any order and/or in parallel to implement process 1100. The operations described with respect to the process 1100 are described as being performed by an electronic device and/or a remote computing resource associated with the document analysis platform. However, it should be understood that some or all of these operations may be performed by some or all of components, devices, and/or systems described herein.

At block 1102, the process 1100 may include receiving a first document including first text In some examples, the first document may be associated with a first technology area.

At block 1104, the process 1100 may include generating one or more first document portions for the first document. In some examples, the one or more first document portions include first words from the first text.

At block 1106, the process 1100 may include identifying second documents associated with the first technology area. In some examples, the second documents may include second text and/or predate the first document.

At block 1108, the process 1100 may include generating one or more second document portions from individual ones of the second documents.

At block 1110, the process 1100 may include determining first word frequencies for individual ones of the first words. In some examples, a first word frequency of the first word frequencies may be based at least in part on a first number of the second documents that include a first word of the first words and/or a second number representing a total number of the second documents.

At block 1112, the process 1100 may include generate first scores for the first words included in the first document portions by assigning first word weights to the first words based at least in part on the first word frequencies. In some examples, the first scores may correspond to the word scores, as described herein. In some examples, the first word weights may be generated based at least in part on the first word frequencies. Additionally, or alternatively, the first word weights may be generated based at least in part on one of the word weight formulas described herein. Additionally, or alternatively, the first word weights may be generated based at least in part on an ML model, as described herein.

At block 1114, the process 1100 may include generating a second score associated with a first document portion of the first document portions based at least in part on the first scores associated with the first words included in the first document portion. In some examples, the second score may correspond to the breadth score(s), claim scores, and/or document scores, as described herein.

At block 1116, the process 1100 may include generating a graphical user interface (GUI) configured to display on a computing device. In some examples, the GUI may be configured to display at least the second score for the first document portion in proximity to an identifier associated with the first document portion.

In some examples, the second documents associated with the first technology area are identified at a first point in time. Additionally, or alternatively, the first word frequencies are determined at the first point in time. Additionally, or alternatively, the process 1100 may include identifying the second documents that are associated with the technology area at a second point in time that is prior to the first point in time. In some examples, the second documents at the second point in time may exclude a third number of the second documents that is less than the total number of the second documents at the first point in time. Additionally, or alternatively, the process 1100 may include determining second word frequencies for individual ones of the first words at the second point in time. In some examples, a second word frequency of the second word frequencies being based at least in part on a fourth number of the second documents that include the first word at the second point in time and/or the third number representing a total number of the second documents at the second point in time. Additionally, or alternatively, the process 1100 may include generating additional first scores for the first words included in the first document portions by assigning second word weights to the first words based at least in part on the second word frequencies. Additionally, or alternatively, the process 1100 may include generating an additional second score associated with the first document portion of the first document portions based at least in part on the additional first scores associated with the first words included in the first document portions. Additionally, or alternatively, the process 1100 may include causing the GUI to display at least the second score for the first document portion in proximity to a first indication of the first point in time and/or the additional second score for the first document portion in proximity to a second indication of the second point in time.

Additionally, or alternatively, the process 1100 may include identifying one or more technology areas including the first technology area. In some examples, the one or more technology areas may be associated with one or more cooperative patent classification (CPC) codes. Additionally, or alternatively, the process 1100 may include generating a machine-learned (ML) model configured to output second word weights associated with one or more second words for individual ones of the one or more technology areas. Additionally, or alternatively, the process 1100 may include identifying, for the individual ones of the one or more technology areas, third documents associated with the individual ones of the one or more technology areas. Additionally, or alternatively, the process 1100 may include determining, for the individual ones of the one or more technology areas, second word frequencies for individual ones of the second words. Additionally, or alternatively, the process 1100 may include generating training data based at least in part on the second word frequencies, the training data indicating second word weights associated with the one or more technology areas. Additionally, or alternatively, the process 1100 may include generating a trained ML model based at least in part on training the ML model using the training data.

Additionally, or alternatively, the process 1100 may include receiving a third document including third text. In some examples, the third document may be associated with a second technology area. Additionally, or alternatively, the process 1100 may include generating one or more third document portions for the third document. In some examples, the one or more third document portions may include the second words from the third text. Additionally, or alternatively, the process 1100 may include inputting individual ones of the one or more third document portions into the trained ML model. Additionally, or alternatively, the process 1100 may include receiving, from the trained ML model and responsive to inputting the individual ones of the one or more third document portions into the trained ML model, the second word weights associated with the second words. Additionally, or alternatively, the process 1100 may include generating additional second scores associated with the individual ones of the third document portions based at least in part on assigning the second word weights to the second words included in the third document portions. Additionally, or alternatively, the process 1100 may include causing the GUI to display at least the additional second scores associated with the individual ones of the third document portions in proximity to respective identifiers associated with the individual ones of the third document portions.

Additionally, or alternatively, the process 1100 may include generating additional second scores associated with individual ones of the first document portions based at least in part on the word scores associated with the first words included in the individual ones of the first document portions. Additionally, or alternatively, the process 1100 may include determining a first ranking of the individual ones of the first document portions based at least in part on the additional second scores. Additionally, or alternatively, the process 1100 may include causing the GUI to display the additional second scores associated with the individual ones of the first document portions in proximity to respective identifiers associated with the individual ones of the first document portions. In some examples, the additional second scores may be displayed according to the first ranking.

Additionally, or alternatively, the process 1100 may include generating a first document score associated with the first document based at least in part on the additional second scores associated with the individual ones of the first document portions. Additionally, or alternatively, the process 1100 may include determining a second ranking of the first document and one or more third documents based at least in part on the first document score and second document scores associated with the one or more third documents. Additionally, or alternatively, the process 1100 may include causing the GUI to display at least the first document score in proximity to a first document identification number associated with the first document and one or more second document scores in proximity to one or more second document identification numbers associated with one or more third documents. In some examples, the first document score and the one or more second document scores may be displayed according to the second ranking.

Additionally, or alternatively, the process 1100 may include generating a third score based at least in part on normalizing the second score. In some examples, the third score may be greater than or equal to a minimum score and less than or equal to a maximum score. Additionally, or alternatively, the process 1100 may include generating a fourth score based at least in part on inverting the third score. Additionally, or alternatively, the process 1100 may include causing the GUI to display at least the fourth score for the first document portion in proximity to the identifier associated with the first document portion.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
   receiving a corpus of documents, the corpus of documents comprising at least a first document including first text;
   pre-processing the first document to generate one or more first processed document portions from the first document, the one or more first processed document portions including first words from the first text;
   identifying second documents that are similar to the first document, individual ones of the second documents including second text;
   pre-processing the second documents to generate one or more second processed document portions from individual ones of the second documents, the one or more second processed document portions including second words from the second text;

determining word frequencies for individual ones of the second words included in the one or more second processed document portions, a word frequency of the word frequencies being based at least in part on a first number of the second documents that include a first word of the second words and a second number representing a total number of the second documents that are similar to the first document;

generating a first word weight associated with the first word based at least in part on taking a cube root of a quotient of the first number of the second documents that include the first word divided by the second number representing the total number of the second documents, wherein:

the first word weight is weighted lesser than the second word weight associated with a second word included in the first text based at least in part on determining that the first word frequency is greater than the second word frequency associated with the second word; or the first word weight is weighted greater than a third word weight associated with a third word based at least in part on determining that the first word frequency is lesser than a third word frequency associated with the third word;

for individual ones of the one or more first processed document portions, identifying:

one or more common words from among the first words based at least in part on the word frequencies associated with the individual ones of the second words, the common words having a first word frequency; and one or more rare words from among the first words based at least in part on the word frequencies associated with the individual ones of the second words, the rare words having a second word frequency that is less than the first word frequency;

generating an element frequency for individual elements included in individual ones of the one or more first processed document portions, the elements comprising one or more of the first words and being determined based at least in part on natural language processing;

generating word scores for the elements based at least in part on assigning word weights to the elements, a first word weight of the word weights being based at least in part on a first element frequency of the element frequencies corresponding to a first element of the elements;

generating breadth scores for the first processed document portions, an individual breadth score corresponding to an individual first processed document portion of the first processed document portions being based at least in part on a sum of the word scores associated with the elements included in the individual first processed document portion; and generating a graphical user interface (GUI) configured to display on a computing device, the GUI configured to display the breadth scores for the first processed document portions in proximity to generated document identification numbers associated with the individual first processed document portion.

2. The method of claim 1, further comprising:

generating percentile breadth scores for the first processed document portions based at least in part on the breadth scores and one or more additional breadth scores;

generating inverted breadth scores for the first processed document portions based at least in part on inverting the percentile breadth scores; and causing the GUI to display the inverted breadth scores for the first processed document portions in proximity to the generated document identification numbers.

3. The method of claim 1, wherein the word scores are first word scores, and the method further comprising:

identifying one or more patents associated with a litigation trial, the one or more patents being similar to the first document;

generating second word scores for second elements included in individual ones of the patents based at least in part on assigning the word weights to the second elements according to the word frequencies;

generating additional breadth scores for individual ones of the patents based at least in part on a sum of the second word scores associated with the second elements included in the individual ones of the patents;

generating comparison data based at least in part on comparing the breadth scores to the additional breadth scores, the comparison data representing a likelihood of infringement of the first document in a district court action;

generating a graphical element to be displayed on the GUI, the graphical element being configured to present at least the breadth scores for the first processed document portions in association with one or more groups that are correlated with one or more likelihoods of infringement in a district court action based at least in part on the comparison data; and causing the GUI to display the graphical element.

4. The method of claim 3, wherein the word frequencies are first word frequencies, the word weights are first word weights, and the first document and the second documents are associated with a first technology area, and the method further comprising:

determining that the total number of the second documents included in the first technology area does not satisfy a threshold number of documents;

determining a second technology area associated with the first document, the second technology area being different from the first technology area and having at least a threshold similarity to the first technology area;

identifying third documents associated with the second technology area;

determining that the total number of the third documents included in the second technology area satisfies the threshold number of documents;

determining second word frequencies for individual ones of third words included in the third documents; and generating the word scores for the first words included in the first processed document portions based at least in part on assigning second word weights to the elements, the second word weights being based at least in part on the second word frequencies.

5. The method of claim 1, further comprising:

identifying the second documents based at least in part on at least one of:

querying one or more generative artificial intelligence (AI) models using the first document;

querying one or more machine-learned (ML) models using the first document; or determining that a first vector representation of the first document is within a threshold similarity to second vector representations of the second documents.

6. The method of claim 1, wherein generating the word scores comprises:

generating first preliminary word scores for the first words included in the first element based at least in part on assigning word weights to the first words included in the first element;

generating second preliminary word scores for the first element included in the first processed document portions based at least in part on assigning the word weights to the first element; and generating the word scores based at least in part on at least one of the first preliminary word scores and the second preliminary word scores.

7. A system comprising:

one or more processors; and one or more non-transitory computer-readable media comprising instructions that, when executed by the one or more processors, cause the one or more processors to perform operations comprising:

receiving a first document including first text;

generating one or more first document portions for the first document, the one or more first document portions including first words from the first text;

identifying second documents that are similar to the first document, the second documents including second text, wherein the second documents that are similar to the first document are identified at a first point in time, and first word frequencies are determined at the first point in time;

generating one or more second document portions from individual ones of the second documents, the one or more second document portions including second words from the second text;

determining the first word frequencies for individual ones of the second words, a first word frequency of the first word frequencies being based at least in part on a first number of the second documents that include a first word of the second words and a second number representing a total number of the second documents;

generate first scores for the first words included in the first document portions by assigning first word weights to the first words based at least in part on the first word frequencies;

generating a second score associated with a first document portion of the first document portions based at least in part on the first scores associated with the first words included in the first document portion;

generating a graphical user interface (GUI) configured to display on a computing device, the GUI configured to display at least the second score for the first document portion in proximity to an identifier associated with the first document portion;

identifying the second documents that are similar to the first document at a second point in time that is prior to the first point in time, the second documents at the second point in time including a third number of the second documents that is less than the total number of the second documents at the first point in time;

determining second word frequencies for individual ones of the second words at the second point in time, a second word frequency of the second word frequencies being based at least in part on a fourth number of the second documents that include the first word at the second point in time and the third number representing a total number of the second documents at the second point in time;

generating additional first scores for the first words included in the first document portions by assigning second word weights to the first words based at least in part on the second word frequencies;

generating an additional second score associated with the first document portion of the first document portions based at least in part on the additional first scores associated with the first words included in the first document portions; and causing the GUI to display at least the second score for the first document portion in proximity to a first indication of the first point in time and the additional second score for the first document portion in proximity to a second indication of the second point in time.

8. The system of claim 7, the operations further comprising:

identifying one or more technology areas being associated with one or more cooperative patent classification (CPC) codes;

generating a machine-learned (ML) model configured to output second word weights associated with one or more second words for individual ones of the one or more technology areas;

identifying, for the individual ones of the one or more CPC codes, third documents associated with the individual ones of the one or more CPC codes, the third documents including third words associated with third document portions of the third documents and being associated with a litigation trial;

determining, for the individual ones of the one or more CPC codes, second word frequencies for individual ones of the third words;

identifying litigation outcomes of the litigation trial for individual ones of the third documents;

generating a machine-learned (ML) model configured to output a likelihood of infringement of a given document in a district court action;

generating training data based at least in part on the second word frequencies and the litigation outcomes; and generating a trained ML model based at least in part on training the ML model using the training data.

9. The system of claim 8, the operations further comprising receiving a fourth document including fourth text, the fourth document being associated with a first technology area;

generating one or more fourth document portions for the fourth document, the one or more fourth document portions including fourth words from the fourth text;

inputting individual ones of the one or more fourth document portions into the trained ML model;

receiving, from the trained ML model and responsive to inputting the individual ones of the one or more fourth document portions into the trained ML model, first likelihoods of infringement of the fourth document portions in a district court action; and causing the GUI to display at least the first likelihoods of infringement of the fourth document portions in a district court action.

10. The system of claim 7, the operations further comprising:

generating additional second scores associated with individual ones of the first document portions based at least in part on the word scores associated with the first words included in the individual ones of the first document portions;

determining a first ranking of the individual ones of the first document portions based at least in part on the additional second scores; and causing the GUI to display the additional second scores associated with the individual ones of the first document portions in proximity to respective identifiers associated with the individual ones of the first document portions, wherein the additional second scores are displayed according to the first ranking.

11. The system of claim 10, the operations further comprising:

generating a first document score associated with the first document based at least in part on the additional second scores associated with the individual ones of the first document portions;

determining a second ranking of the first document and one or more third documents based at least in part on the first document score and second document scores associated with the one or more third documents; and causing the GUI to display at least the first document score in proximity to a first document identification number associated with the first document and one or more second document scores in proximity to one or more second document identification numbers associated with one or more third documents, wherein the first document score and the one or more second document scores are displayed according to the second ranking.

12. The system of claim 7, the operations further comprising generating the first document portions based at least in part on:

identifying, using natural language processing, a listing of stop words, duplicate words, and punctuation in the first text based at least in part on respective computer representations associated with the stop words, duplicate words, and punctuation; and removing the stop words, duplicate words, and punctuation from the first text.

13. A method comprising:

receiving a first document including first text, the first document being associated with a first technology area;

generating one or more first document portions for the first document, the one or more first document portions including first words from the first text;

identifying second documents associated with the first technology area, the second documents including second text and predating the first document;

generating one or more second document portions from individual ones of the second documents;

determining word frequencies for individual ones of the first words, a first word frequency of the word frequencies being based at least in part on a first number of the second documents that include a first word of the first words and a second number representing a total number of the second documents, and wherein determining the first word frequency associated with the first word based at least in part on taking a cube root of a quotient of the first number of the second documents that include the first word divided by the second number representing the total number of the second documents associated with the first technology area;

generating a first word weight associated with the first technology area based at least in part on the first word frequency, wherein:

the first word weight is weighted higher than a second word weight associated with a second word included in the first text based at least in part on determining that the first word frequency is less than a second word frequency associated with the second word; or the first word weight is weighted lower than the second word weight associated with the second word based at least in part on determining that the first word frequency is greater than the second word frequency;

generate first scores for the first words included in the first document portions by assigning word weights to the first words based at least in part on the word frequencies;

generating a second score associated with a first document portion of the first document portions based at least in part on the first scores associated with the first words included in the first document portion; and generating a graphical user interface (GUI) configured to display on a computing device, the GUI configured to display at least the second score for the first document portion in proximity to an identifier associated with the first document portion.

14. The method of claim 13, further comprising determining the first technology area associated with the first document based at least in part on the first text, wherein the first technology area is associated with a cooperative patent classification (CPC) code.

15. The method of claim 13, wherein the first document is a first intellectual property (IP) asset and the second documents are second IP assets.

16. The method of claim 13, further comprising generating a third score based at least in part on normalizing the second score, wherein the third score is greater than or equal to a minimum score and less than or equal to a maximum score;

generating a fourth score based at least in part on inverting the third score; and causing the GUI to display at least the fourth score for the first document portion in proximity to an identifier associated with the first document portion.

17. The method of claim 13, wherein the word scores are first word scores and the method further comprising:

identifying one or more patents associated with a litigation trial, the one or more patents being associated with the first technology area;

generating additional first scores for second words included in individual ones of the patents based at least in part on assigning the word weights to the second words;

generating additional second scores for individual ones of the patents based at least in part on a sum of the additional first scores associated with the second words included in the individual ones of the patents;

generating comparison data based at least in part on comparing the second score to the additional second scores, the comparison data representing a likelihood of infringement of the first document in a district court action;

generating a graphical element to be displayed on the GUI, the graphical element being configured to present at least the second score for the first document portion in association with one or more groups that are correlated with one or more likelihoods of infringement in a district court action; and causing the GUI to display the graphical element.

* * * * *